(12) United States Patent  
Podnar

(10) Patent No.: US 9,580,120 B2
(45) Date of Patent: Feb. 28, 2017

(54) METHOD AND APPARATUS FOR MOVING A ROBOTIC VEHICLE

(71) Applicant: The Boeing Company, Chicago, IL (US)

(72) Inventor: Gregg W. Podnar, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/725,194

(22) Filed: May 29, 2015

(65) Prior Publication Data

US 2016/0347382 A1 Dec. 1, 2016

(51) Int. Cl.
| | |
|---|---|
| *G05D 1/00* | (2006.01) |
| *B25J 9/00* | (2006.01) |
| *B62D 55/06* | (2006.01) |
| *B25J 5/00* | (2006.01) |
| *B25J 9/16* | (2006.01) |

(52) U.S. Cl.
CPC .............. *B62D 55/06* (2013.01); *B25J 5/005* (2013.01); *B25J 5/007* (2013.01); *B25J 9/1679* (2013.01); *G05D 1/0011* (2013.01); *Y10S 901/01* (2013.01)

(58) Field of Classification Search
CPC . B62D 55/06; B25J 5/005; B25J 5/007; B25J 9/1679; G05D 1/0011; Y10S 901/01
See application file for complete search history.

(56) References Cited

U.S. PATENT DOCUMENTS

| | | | |
|---|---|---|---|
| 4,341,416 A | 7/1982 | Richard | |
| 4,960,150 A | 10/1990 | Ryan | |
| 6,032,428 A | 3/2000 | Rosan et al. | |
| 7,348,747 B1* | 3/2008 | Theobold | B25J 5/005 318/568.11 |
| 2007/0061040 A1* | 3/2007 | Augenbraun | A47L 5/225 700/245 |
| 2007/0073439 A1* | 3/2007 | Habibi | B25J 9/1697 700/213 |
| 2010/0263948 A1* | 10/2010 | Couture | B25J 5/005 180/8.2 |
| 2013/0238183 A1* | 9/2013 | Goulding | B62D 57/024 701/26 |

* cited by examiner

*Primary Examiner* — Mary Cheung
(74) *Attorney, Agent, or Firm* — Yee & Associates, P.C.

(57) ABSTRACT

A method and apparatus for moving a robotic vehicle relative to a structure. A set of tracks associated with a base of the robotic vehicle may be deployed. A number of attachment units associated with the set of tracks may be aligned with a corresponding portion of a number of structural members of the structure in a forward sequence as the set of tracks is deployed. The number of attachment units may be secured to the corresponding portion of the number of structural members in the forward sequence.

35 Claims, 16 Drawing Sheets

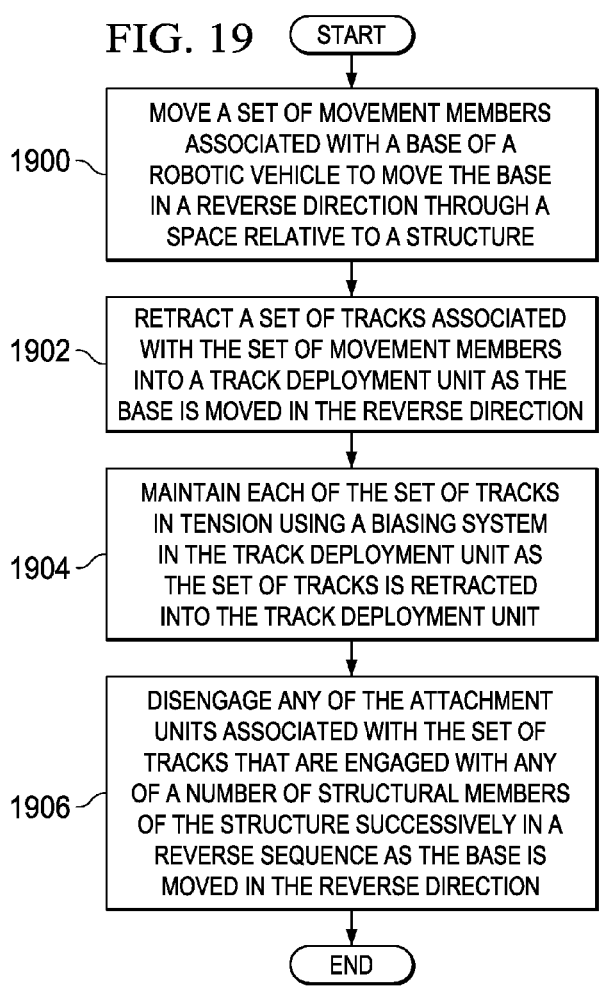
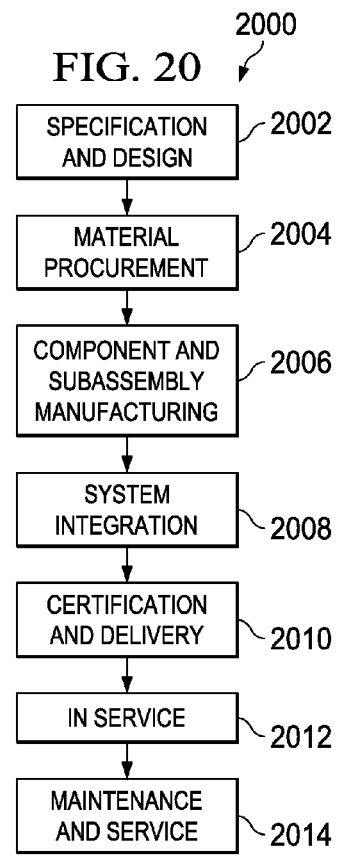
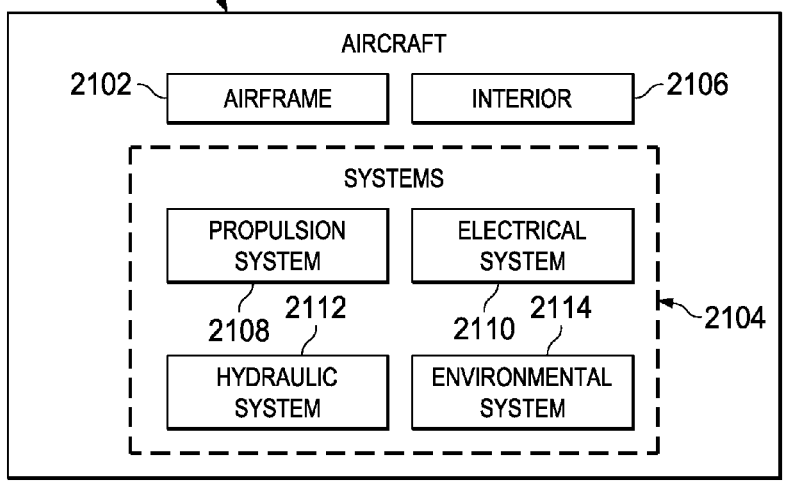

METHOD AND APPARATUS FOR MOVING A ROBOTIC VEHICLE

BACKGROUND INFORMATION

1. Field

The present disclosure relates generally to robotic vehicles and, in particular, to a method and apparatus for moving a robotic vehicle within a space using a set of tracks and attachment units associated with the set of tracks.

2. Background

In certain situations, operations may need to be performed within a space that is difficult to access or a space within which moving is difficult. For example, the space may be a confined space that is restricted in width, height, area, volume, or a combination thereof. In some cases, access to the space may be limited by the entrance into the space. In other cases, moving through a space may be difficult because a continuous and smooth surface is not present.

The interior of a wing box for an aircraft may be an example of one type of space that may be difficult to access and within which moving can be difficult. In some cases, the entire interior of a wing box may be considered one space. In other cases, each wing bay within the wing box may be considered a different space.

Currently, performing operations within the interior of a wing box may be more difficult than desired. For example, to perform an operation within a wing bay inside the wing box, a human operator may need to enter the wing bay through an access port. However, the access hole that is the entrance into the wing bay may be limiting in size. Further, the confined nature of the wing bay may hinder the ability of the human operator to perform operations within the wing bay. Still further, the presence of structures, such as stringers, mounted to the inner skin panels of the wing box may impede movement of the human operator through the wing box.

In some cases, a robotic arm may be used to perform operations within a wing box. For example, a robotic arm, supported by a base located outside of the wing box, may reach into the wing box through an access port. However, some currently available robotic arms have limited reach. Consequently, these types of robotic arms may be unable to perform certain types of operations.

Some currently available robotic vehicles may be small enough to enter a wing box through an access port. However, moving these robotic vehicles through the wing box may be more difficult than desired and, in some cases, infeasible. In particular, moving these robotic vehicles over the inner skin panels of the wing box and over structures, such as stringers, mounted to the inner skin panels may be more difficult than desired and, in some cases, infeasible. Additionally, providing power to these robotic vehicles such that the robotic vehicles may maneuver and perform operations within these spaces may be more difficult than desired. Therefore, it would be desirable to have a method and apparatus that take into account at least some of the issues discussed above, as well as other possible issues.

SUMMARY

In one illustrative embodiment, a method is provided for moving a robotic vehicle relative to a structure. A set of tracks associated with a base of the robotic vehicle may be deployed. A number of attachment units associated with the set of tracks may be aligned with a corresponding portion of a number of structural members of the structure in a forward sequence as the set of tracks is deployed. The number of attachment units may be secured to the corresponding portion of the number of structural members in the forward sequence.

In another illustrative embodiment, an apparatus comprises a base, a set of movement members, a set of tracks, and a number of attachment units. The set of moment members may be associated with the base. The set of tracks may be associated with the set of movement members. The number of attachment units may be associated with the set of tracks.

In yet another illustrative embodiment, a robotic vehicle comprises a base, a number of tools associated with the base, and a movement system associated with the base for moving the base and the number of tools within a space relative to a structure. The movement system comprises a set of movement members associated with the base, a set of tracks associated with the set of movement members, and a plurality of attachment units associated with the set of tracks. The set of movement members may be for moving the base in one of a forward direction and a reverse direction. The set of tracks may be deployed when the base is moved in the forward direction and retracted when the base is moved in the reverse direction. The plurality of attachment units may be for securing the set of tracks. A number of attachment units in the plurality of attachment units may be configured to align with and engage a corresponding portion of a number of structural members as the set of tracks is deployed.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 19 is an illustration of a process for moving a robotic vehicle through a space relative to a structure in the form of a flowchart in accordance with an illustrative embodiment;

FIG. 20 is an illustration of an aircraft manufacturing and service method in the form of a block diagram in accordance with an illustrative embodiment; and FIG. 21 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a robotic vehicle capable of quickly and securely moving through a space relative to a structure to perform various operations. As one illustrative example, it may be desirable to have a robotic vehicle capable of quickly and securely moving through the interior of a wing box without being encumbered by various structures, such as stringers, located within the wing box.

Thus, the illustrative embodiments provide a method and apparatus for moving a robotic vehicle relative to a structure. In one illustrative example, a set of tracks associated with a base of the robotic vehicle may be deployed in correspondence with moving the base in a forward direction. A number of attachment units associated with the set of tracks may be aligned with a corresponding number of structural members of the structure in a forward sequence as the set of tracks is deployed. The number of attachment units may be secured to the corresponding number of structural members in the forward sequence to stabilize the robotic vehicle relative to the structure.

In particular, the number of attachment units associated with the set of tracks may be quickly and easily engaged with the number of structural members such that the robotic vehicle may move smoothly into and through the space relative to the structure. Further, the number of attachment units associated with the set of tracks may be quickly and easily disengaged from the number of structural members such that the robotic vehicle may move smoothly out of the space relative to the structure.

Figure 1:
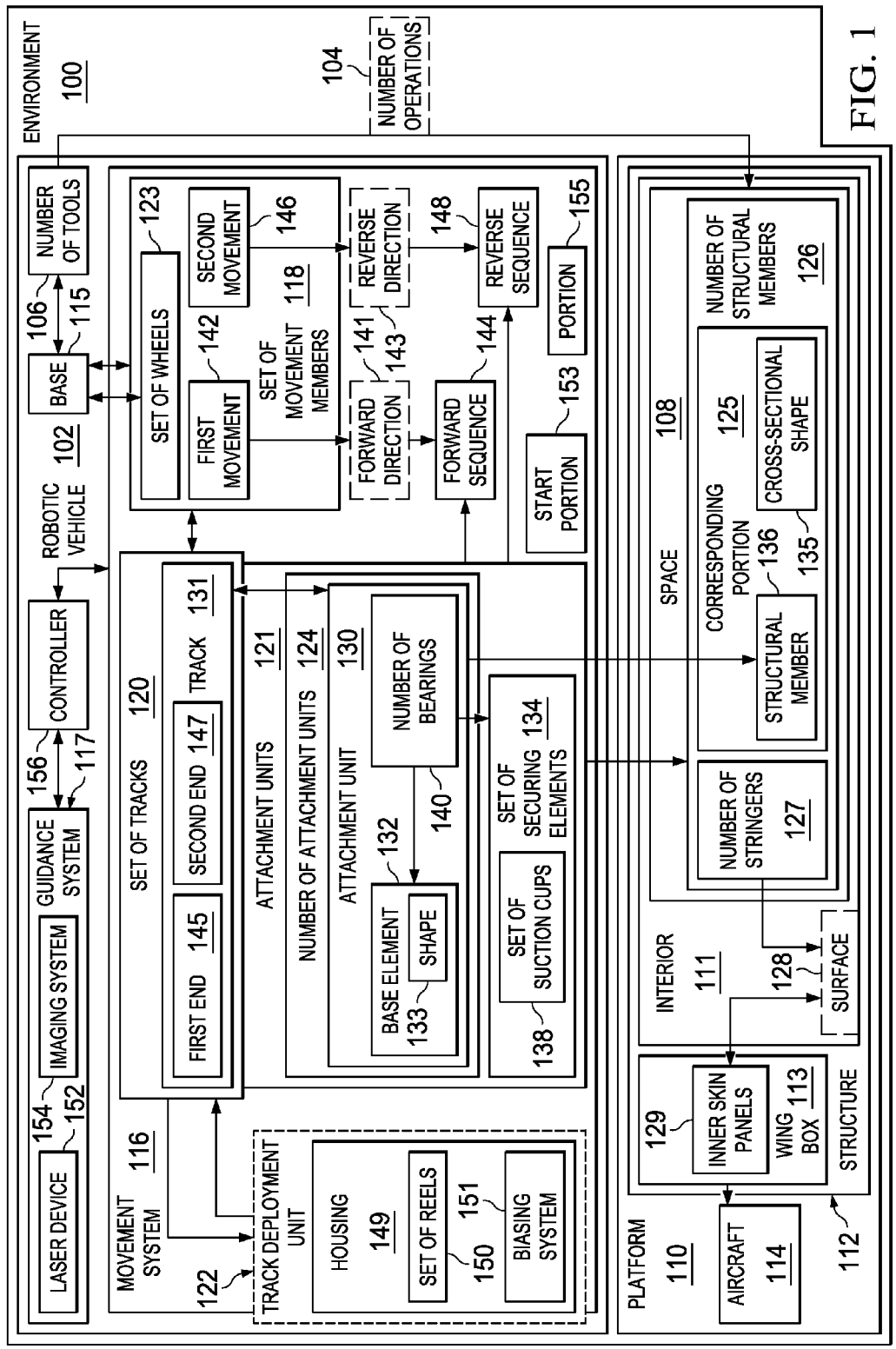
FIG. 1 is an illustration of an environment in the form of a block diagram in accordance with an illustrative embodiment.

Referring now to the figures and, in particular, with reference to FIG. 1, an illustration of an environment is depicted in the form of a block diagram in accordance with an illustrative embodiment. In this illustrative example, environment 100 may be an example of an environment in which robotic vehicle 102 may be used to perform number of operations 104. As used herein, a "number of" items may include one or more items. In this manner, number of operations 104 may include one or more operations.

Number of tools 106 may be used to perform number of operations 104. Number of tools 106 may include, for example, without limitation, at least one of a fastening tool, a drilling tool, a painting tool, an imaging system, a laser scanner, a sealant application device, an inspection tool, a lighting device, a measurement tool, or some other type of tool.

As depicted, number of tools 106 may be associated with robotic vehicle 102. As used herein, when one component is "associated" with another component, the association is a physical association in the depicted examples.

For example, a first component, such as one of number of tools 106, may be considered to be associated with a second component, such as robotic vehicle 102, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, number of tools 106 may be considered part of robotic vehicle 102. However, in other illustrative examples, one or more of number of tools 106 may be considered separate from robotic vehicle 102. For example, one or more of number of tools 106 may be removably associated with robotic vehicle 102. In this manner, one or more of number of tools 106 may be exchangeable.

In this illustrative example, robotic vehicle 102 may be used to perform number of operations 104 within space 108 relative to structure 112, which is associated with platform 110. Space 108 may be an open space around structure 112, a partially enclosed space within and around structure 112, or an enclosed space within structure 112, depending on the implementation. For example, without limitation, space 108 may be a space within interior 111 of structure 112 associated with platform 110. In some cases, the entire interior 111 may be considered space 108.

In one illustrative example, platform 110 may take the form of aircraft 114 and structure 112 may take the form of wing box 113. In this example, space 108 may be within interior 111 of wing box 113. In other illustrative examples, structure 112, platform 110, or both may take some other suitable form.

As depicted, robotic vehicle 102 may include base 115, movement system 116, and guidance system 117. Base 115 may be comprised of any number of sections associated with each other, depending on the implementation. In some cases, these sections may be flexibly associated with each other. In this manner, base 115 may be articulated such that base 115 has flexibility of movement.

Further, the geometric dimensions and geometric shape of each of the number of sections that form base 115 may be selected based on the restrictions and constraints of space 108 and any entrance into space 108. For example, without limitation, when space 108 is inside wing box 113, base 115 may have be shaped and sized such that base 115 may be capable of easily moving into and out of one or more access holes in wing box 113 that lead to space 108.

Number of tools 106, movement system 116, and guidance system 117 may each be associated with base 115. Movement system 116 may be used to move base 115 into space 108, through space 108, and out of space 108.

In one illustrative example, movement system 116 includes set of movement members 118, set of tracks 120, attachment units 121, and track deployment unit 122. In other illustrative examples, track deployment unit 122 may be considered separate from movement system 116.

As used herein, a "set of" items may include one or more items. In this manner, set of movement members 118 may include one or more movement members.

Set of movement members 118 may be associated with base 115. Moving set of movement members 118 may move base 115, and thereby, number of tools 106 associated with base 115. In one illustrative example, set of movement members 118 includes set of wheels 123 associated with base 115.

Set of tracks 120 is associated with set of movement members 118 such that movement of set of movement members 118 causes movement of set of tracks 120. In other words, set of movement members 118 may enable the movement of set of tracks 120. For example, without limitation, when set of movement members 118 takes the form of set of wheels 123, the rotation of set of wheels 123 may cause corresponding movement of set of tracks 120.

Attachment units 121 are associated with set of tracks 120. At any given point in time when robotic vehicle 102 is located within space 108, at least one of attachment units 121 may be used to secure set of tracks 120 to structure 112.

For example, without limitation, number of attachment units 124 may be used to secure set of tracks 120 to corresponding portion 125 of number of structural members 126 of structure 112. Corresponding portion 125 of structural members 126 may include one, some, or all of number of structural members 126, depending on the implementation. In one illustrative example, number of structural members 126 takes the form of number of stringers 127 in one illustrative example.

In this manner, number of attachment units 124 may interface robotic vehicle 102 with structure 112. When secured to corresponding portion 125 of number of structural members 126, number of attachment units 124 and thereby, set of tracks 120, help support and stabilize robotic vehicle 102 relative to structure 112.

For example, without limitation, when structure 112 takes the form of wing box 113, surface 128 may be formed by the surfaces of inner skin panels 129 that form a portion of wing box 113. Number of stringers 127 may be located along and attached to inner skin panels 129 that form surface 128. Number of stringers 127 may make surface 128 difficult to traverse. In particular, number of stringers 127 may impede continuous and smooth movement directly over surface 128.

However, set of tracks 120 may be used to move robotic vehicle 102 into space 108 over number of structural members 126 in a manner such that robotic vehicle 102 does not contact surface 128. Number of attachment units 124 may secure set of tracks 120, and thereby, robotic vehicle 102, to corresponding portion 125 of number of structural members 126. In this manner, number of attachment units 124 support and stabilize set of tracks 120, and thereby, robotic vehicle 102, relative to structure 112 through corresponding portion 125 of number of structural members 126.

Attachment unit 130 may be an example of one of attachment units 121. Attachment unit 130 may be associated with track 131, which may be an example of one of set of tracks 120.

As depicted, attachment unit 130 may include base element 132 and set of securing elements 134. Set of securing elements 134 may be associated with base element 132 in any number of different ways.

Base element 132 may be attached to track 131. In some cases, attachment unit 130 may be associated with each of set of tracks 120 instead of only track 131. For example, base element 132 may be attached to each of set of tracks 120.

Base element 132 of attachment unit 130 may have shape 133. Shape 133 is selected to correspond with the type of structural members to which attachment unit 130 may be secured. In this manner, each of attachment units 121 may be configured for a corresponding one of number of structural members 126.

As one illustrative example, shape 133 of base element 132 may be selected to correspond to any structural member having selected shape 135. Depending on the implementation, selected shape 135 may be a cross-sectional shape, a three-dimensional shape, or some other type of geometric shape.

In some illustrative examples, selected shape 135 may be a cross-sectional shape for a cross-section of a structural member that is taken substantially perpendicularly to the longitudinal axis of that structural member. When selected shape 135 is a cross-sectional shape, the cross-sectional shape may be selected from one of an I-shape, an L-shape, a T-shape, a C-shape, a hat-shape, a U-shape, a curved shape, a square shape, a rectangular shape, or some other type of cross-sectional shape. Depending on the shape of each of number of structural members 126, attachment units 121 may be configured for structural members having different cross-sectional shapes, the same cross-sectional shape, or both.

Set of securing elements 134 may be used to secure attachment unit 130 to a corresponding one of number of structural members 126. Structural member 136 may be an example of one of number of structural members 126. Structural member 136 may have selected shape 135. Set of securing elements 134 may be used to secure attachment unit 130 to structural member 136.

In one illustrative example, set of securing elements 134 takes the form of set of suction cups 138. However, in other illustrative examples, set of securing elements 134 may be implemented in some other manner. For example, depending on the implementation, set of securing elements 134 may include at least one of a suction cup, a vacuum attachment device, a clamping device, a layer of temporary adhesive on base element 132, removable tape, a bladder, or some other type of securing element.

In some illustrative examples, each of set of securing elements 134 may take the form of an element comprised of an elastomeric material, such as, but not limited to rubber. Set of securing elements 134 may be associated with base element 132 in a manner such that an interference fit may be formed between attachment unit 130 and structural member 136.

In one illustrative example, set of securing elements 134 may take the form of a single layer of elastomeric material associated with base element 132. When base element 132 is positioned relative to structural member 136, applying force to attachment unit 130 in a direction towards structural member 136 may create an interference fit between set of securing elements 134 and structural member 136. This force may be applied by, for example, without limitation, the weight of robotic vehicle 102.

In some illustrative examples, attachment unit 130 may include number of bearings 140 associated with base element 132. Number of bearings 140 may be used to constrain movement of attachment unit 130 relative to, for example, structural member 136 once set of securing elements 134 have been secured to structural member 136.

With reference now to the movement of robotic vehicle 102, robotic vehicle 102 may be moved through space 108 relative to structure 112 in forward direction 141 or in reverse direction 143 using movement system 116. Movement of robotic vehicle 102 in forward direction 141 may be performed by first movement 142 of set of movement members 118 of movement system 116. When set of movement members 118 takes the form of set of wheels 123, first movement 142 may be forward rotational movement.

First movement 142 of set of movement members 118 causes base 115 to move in forward direction 141. Further, first movement 142 of set of movement members 118 causes set of tracks 120 to deploy from track deployment unit 122 in forward direction 141.

Conversely, second movement 146 of set of movement members 118 causes base 115 to move in reverse direction 143. Further, second movement 146 causes set of tracks 120 to retract into track deployment unit 122 in reverse direction 143.

Track deployment unit 122 may take a number of different forms. In one illustrative example, track deployment unit 122 may include housing 149, set of reels 150, and biasing system 151. In this example, set of reels 150 and biasing system 151 may be located inside housing 149.

At least a portion of set of tracks 120 may be wound around set of reels 150. Set of tracks 120 may be deployed by being unwound from set of reels 150 and may be retracted by being wound back around set of reels 150. For example, track 131 may have first end 145 and second end 147. First end 145 and second end 147 may be fixedly associated with track deployment unit 122.

For example, without limitation, first end 145 may be fixedly associated with housing 149, and second end 147 may be fixedly associated with at least one of set of reels 150. Track 131 may be wound around at least one of set of reels 150 beginning at second end 147.

In one illustrative example, robotic vehicle 102 is moved relative to structure 112 from start position 153 outside of space 108 into position 155 within space 108. In position 155, number of attachment units 124 secures robotic vehicle 102 to corresponding portion 125 of number of structural members 126.

This movement from start position 153 to position 155 may be performed by moving set of movement members 118 to move base 115 in forward direction 141. Forward direction 141 is a direction away from start position 153 towards position 155. Moving set of movement members 118 causes set of tracks 120 to be deployed from track deployment unit 122 in correspondence with base 115 in forward direction 141.

As set of tracks 120 is deployed, number of attachment units 124 may be aligned with and secured with corresponding portion 125 of number of structural members 126 in forward sequence 144. As one illustrative example, number of attachment units 124 may be consecutively aligned with each of corresponding portion 125 of number of structural members 126 as base 115 moves in forward direction 141 and set of tracks 120 deploys in forward direction 141. Once in position 155, robotic vehicle 102 may be moved into other positions farther within space 108 in a similar manner.

Conversely, robotic vehicle 102 may be moved relative to structure 112 from position 155 back into start position 153 outside of space 108. This movement from position 155 to start position 153 may be performed by moving set of movement members 118 to move base 115 in reverse direction 143. Reverse direction 143 is a direction away from position 155 towards start position 153. Moving set of movement members 118 causes set of tracks 120 to be retracted into track deployment unit 122 in correspondence with base 115 in reverse direction 143.

As set of tracks 120 is retracted, number of attachment units 124 may be detached from or disengaged from corresponding portion 125 of number of structural members 126 in reverse sequence 148. Reverse sequence 148 may be the reverse of forward sequence 144.

Biasing system 151 within track deployment unit 122 may be used to bias set of tracks 120 when set of tracks 120 is deployed. For example, biasing system 151 may hold set of tracks 120 in tension such that any slack in set of tracks 120 during deployment or retraction is reduced to within selected tolerances. In other words, biasing system 151 may positively constrain set of tracks 120 in forward direction 141. Further, this tension may aid in the retraction of set of tracks 120.

Biasing system 151 may include at least one of a tension spring, an elastic object, a bearing, a deformable element, or some other type of element. In some illustrative examples, biasing system 151 may be motorized and include at least one of a motor, an active control element, a tension sensor, a position sensor, a movement sensor, or some other type of element or device.

Attachment units 121 are spaced along set of tracks 120 such that during deployment, the unwinding of set of tracks 120 from set of reels 150 causes at least one of attachment units 121 to come into contact with at least one of number of structural members 126. The spacing of attachment units 121 may be substantially even or uneven, depending on the implementation. For example, the spacing of attachment units 121 may be selected to match the spacing of number of structural members 126.

For example, as set of movement members 118, and thereby robotic vehicle 102, move in forward direction 141, one or more of attachment units 121 may engage one or more number of structural members 126, respectively, in succession. In other words, as set of tracks 120 is deployed from track deployment unit 122, number of attachment units 124 successively engage corresponding portion 125 of number of structural members 126 in forward sequence 144.

When set of movement members 118, and thereby robotic vehicle 102, move in reverse direction 143, the tension holding set of tracks 120 causes set of tracks 120 to be retracted back into track deployment unit 122. The automatic retracting of set of tracks 120 causes any attachment units that are engaged with any of number of structural members 126 to be disengaged from these structural members in reverse sequence 148. In other words, as set of tracks 120 is retracted back into track deployment unit 122, number of attachment units 124 may be successively disengaged from corresponding portion 125 of number of structural members 126 in the reverse of the manner in which they were engaged.

Guidance system 117 of robotic vehicle 102 may be used to guide the movement of robotic vehicle 102. Guidance system 117 may include, for example, without limitation, at least one of laser device 152, imaging system 154, or some other type of sensor device or other device.

In these illustrative examples, robotic vehicle 102 may also include controller 156. In one illustrative example, controller 156 takes the form of a computer system.

Controller 156 may be used to control movement system 116. In some cases, controller 156 may control movement system 116 by generating and sending commands to movement system 116 based on information received from guidance system 117. For example, without limitation, laser device 152 may be used to provide distance information to controller 156. Controller 156 may use this distance information to determine at least one of how much farther robotic vehicle 102 is to be moved within space 108 or the speed of robotic vehicle 102. Controller 156 may then control set of movement members 118 to move robotic vehicle 102 accordingly.

As robotic vehicle 102 moves through space 108, number of tools 106 may be used to perform number of operations 104 within space 108. Set of tracks 120 and attachment units 121 enable robotic vehicle 102 to be securely interfaced with structure 112 during the performance of these operations. For example, without limitation, robotic vehicle 102 may be moved to a selected position relative to structure 112. Set of tracks 120 and attachment units 121 may help stabilize robotic vehicle 102 such that number of operations 104 may be accurately performed at this selected position.

Using set of tracks 120 and attachment units 121 may also enable robotic vehicle 102 to easily and quickly move through space 108 in a smooth manner without being impeded by number of structural members 126. Further, the configuration of set of tracks 120 and attachment units 121 may enable robotic vehicle 102 to maintain a low profile and small size such that robotic vehicle 102 may quickly and easily move through space 108 relative to structure 112.

The illustration of environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, attachment unit 130 may not include base element 132. Instead, set of securing elements 134 may be directly attached to track 131. In other illustrative examples, guidance system 117 may include other components in addition to or in place of laser device 152 or imaging system 154. In still other illustrative examples, track deployment unit 122 may be associated with base 115.

In other illustrative examples, structure 112 may take the form of a pipe, a pipe rack, a structural wall, a side of a building, a ladder, a fence, a floor, a subfloor, or some other type of structure that has number of structural members 126 that may make traversal relative to structure 112 difficult. As one illustrative example, structure 112 may take the form of a wood floor, a wood subflooring, an aircraft flooring comprised of floor beams, or some other type of flooring or subflooring. Robotic vehicle 102 may be used to traverse this type flooring or subflooring. In other illustrative examples, robotic vehicle 102 may be used to install this type of flooring or subflooring.

In some illustrative examples, space 108 or access to space 108 may be limited by, obstructed by, restricted by, or otherwise encumbered by number of structural members 126. For example, without limitation, when structure 112 takes the form of a ladder, number of structural members 126 may be the rungs of the ladder. Traversing number of structural members 126 without set of tracks 120 and attachment units 121 associated with set of tracks 120 may be more difficult for robotic vehicle 102 than traversing number of structural members 126 with set of tracks 120 and attachment units 121.

Attachment units 121 associated with set of tracks 120 may be implemented in other ways than those described above. For example, without limitation, one or more attachment units of attachment units 121 may be removably associated with set of tracks 120. In this manner, these attachment units may be exchangeable. For example, without limitation, attachment unit 130 may be removably associated with track 131 such that attachment unit 130 may be exchanged with a different attachment unit.

In some illustrative examples, the position of attachment unit 130 along track 131 may be moveable. For example, without limitation, attachment unit 130 may be removably associated with track 131 such that attachment unit 130 may be interfaced with track 131 at different positions along track 131. Other attachment units of attachment units 121 may be similarly removably associated with set of tracks 120. In this manner, attachment units 121 may be reconfigurable such that attachment units 121 may be tailored to the specific geometric requirements of number of structural members 126 to which attachment units 121 are to adhere.

Further, controller 156 may be implemented in some other manner other than a computer system in other illustrative examples. Depending on the implementation, controller 156 may be implemented in software, hardware, firmware, or a combination thereof. When software is used, the operations performed by controller 156 may be implemented using, for example, without limitation, program code configured to run on a processor unit. When firmware is used, the operations performed by controller 156 may be implemented using, for example, without limitation, program code and data and stored in persistent memory to run on a processor unit.

When hardware is employed, the hardware may include one or more circuits that operate to perform the operations performed by controller 156. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by controller 156 may be performed using organic components integrated with inorganic components. In some cases, the operations and processes may be performed by entirely organic components, excluding a human being. As one illustrative example, circuits in organic semiconductors may be used to perform these operations and processes.

Figure 2:
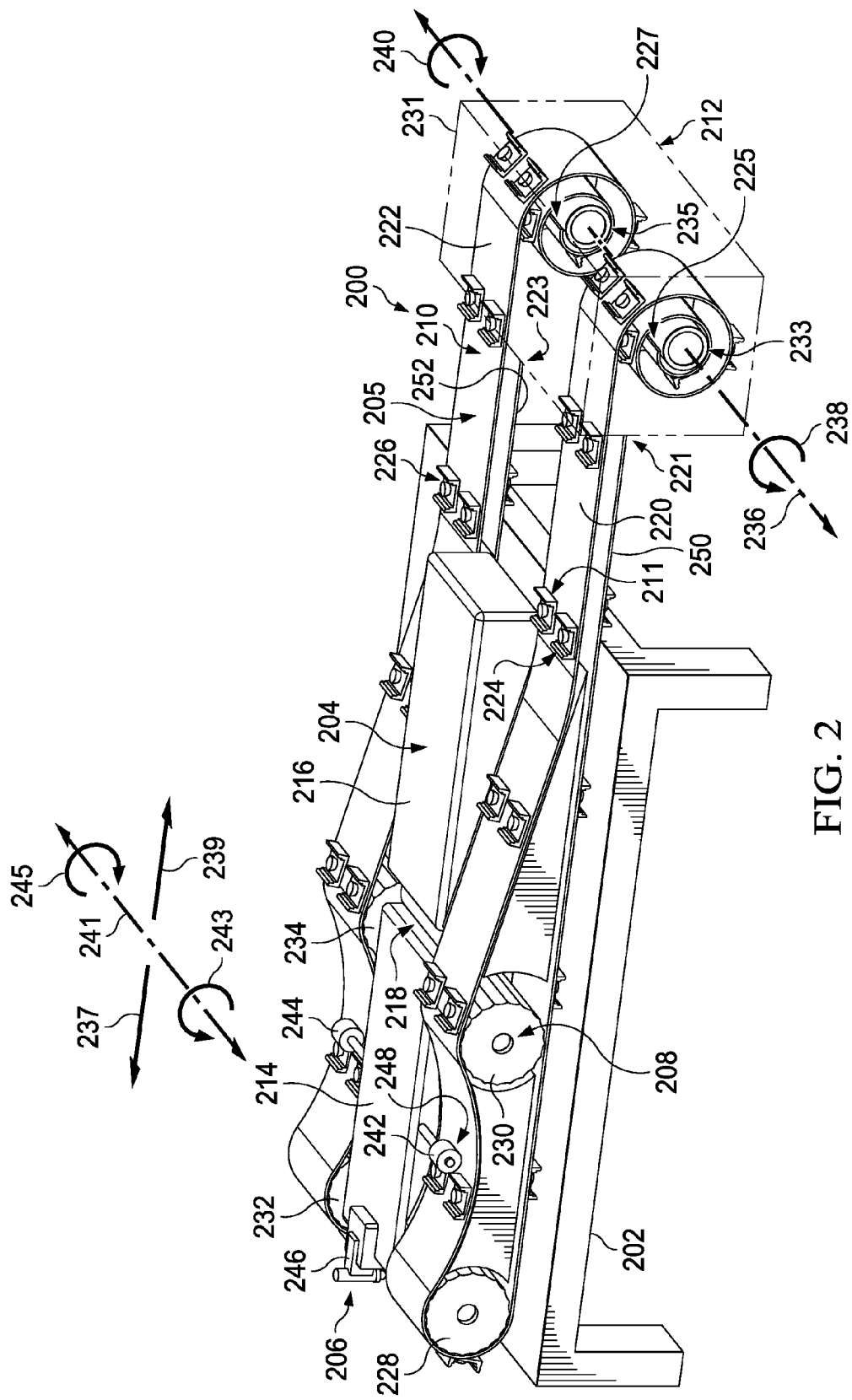
FIG. 2 is an illustration of an isometric view of a robotic vehicle in accordance with an illustrative embodiment.

With reference now to FIG. 2, an illustration of an isometric view of a robotic vehicle is depicted in accordance with an illustrative embodiment. In this illustrative example, robotic vehicle 200 may be an example of one implementation for robotic vehicle 102 in FIG. 1. As depicted, robotic vehicle 200 is shown at least partially positioned over platform structure 202. Platform structure 202 may be used for storing robotic vehicle 200 when robotic vehicle 200 is not in use.

In this illustrative example, robotic vehicle 200 includes base 204, movement system 205, and guidance system 206, which may be examples of implementations for base 115, movement system 116, and guidance system 117, respectively, in FIG. 1. As depicted, movement system 205 and guidance system 206 may be associated with base 204.

Base 204 may include first section 214 and second section 216, which are flexibly associated through interface 218. In this illustrative example, interface 218 may be a hinge-type interface. In this manner, base 204 may be articulated. The articulation of base 204 may enable robotic vehicle 200 to easily traverse over uneven surfaces, while maintaining a low profile such that robotic vehicle 200 does not contact other structures within a space in an undesired manner.

Movement system 205 may include set of wheels 208, set of tracks 210, attachment units 211, and track deployment unit 212, which may be examples of implementations for set of wheels 123, set of tracks 120, attachment units 121, and track deployment unit 122, respectively, in FIG. 1. As depicted, set of tracks 210 may include first track 220 and second track 222, each of which may be an example of an implementation for track 131 in FIG. 1.

Attachment units 211 may be associated with set of tracks 210. In particular, attachment units 211 includes first attachment units 224 associated with first track 220 and second attachment units 226 associated with second track 222.

Set of tracks 210 may be associated with set of wheels 208, which are, in turn, associated with base 204. In this illustrative example, set of wheels 208 includes wheel 228, wheel 230, wheel 232, and wheel 234.

Set of tracks 210 may also be associated with track deployment unit 212. As depicted, first track 220 has first end 221 and second end 225. Second track 222 has first end 223 and second end 227. First end 221 and first end 223 may each be an example of one implementation for first end 145 in FIG. 1. Second end 225 and second end 227 may each be an example of one implementation for second end 147 in FIG. 1.

As depicted, track deployment unit 212 may include housing 231, reel 233, and reel 235. Both reel 233 and reel 235 may be located within housing 231. Reel 233 and reel 235 of track deployment unit 212 may be an example of one implementation for set of reels 150 in FIG. 1. In this illustrative example, first end 221 of first track 220 and first end 223 of second track 222 may be fixedly associated with housing 231. Second end 225 of first track 220 and second end 227 of second track 222 may be fixedly associated with reel 233 and reel 235, respectively.

As depicted, at least a portion of first track 220 may be wound around reel 233 beginning at second end 225 of first track 220. At least a portion of second track 222 may be wound around reel 235 beginning at second end 227 of second track 222.

A biasing system (not shown), similar to biasing system 151 described in FIG. 1, may be used to hold first track 220 in tension with reel 233 and second track 222 in tension with reel 235. In other words, this biasing system (not shown) may positively constrain first track 220 and second track 222 such that these tracks may only be unwound from reel 233 and reel 235, respectively, by applying force to these tracks in forward direction 237.

First rotation of set of wheels 208 about an axis substantially parallel to axis 241 in the direction of arrow 243 may result in the movement of base 204, and thereby robotic vehicle 200, in forward direction 237. This first rotation of set of wheels 208 may cause reel 233 and reel 235 to rotate about axis 236 in the direction of arrow 238. Rotation of reel 233 and reel 235 about axis 236 in the direction of arrow 238 may cause first track 220 and second track 222, respectively, to be unwound from reel 233 and reel 235, respectively. In this manner, reel 233 and reel 235 may feed first track 220 and second track 222, respectively, in forward direction 237 towards base 204.

Conversely, second rotation of set of wheels 208 about an axis substantially parallel to axis 241 in the direction of arrow 245 may result in the movement of base 204, and thereby robotic vehicle 200, in reverse direction 239. This second rotation of set of wheels 208 in reverse direction 239 may cause reel 233 and reel 235 to rotate about axis 236 in the direction of arrow 240. Rotation of reel 233 and reel 235 about axis 236 in the direction of arrow 240 may cause first track 220 and second track 222, respectively, to be wound back around reel 233 and reel 235, respectively. In this manner, first track 220 and second track 222 may be retracted back into track deployment unit 212.

In some illustrative examples, surface 250 of first track 220 and surface 252 of second track 222 come into contact with set of wheels 208. These surfaces may be comprised of a friction material that helps facilitate smooth movement of set of tracks 210 around set of wheels 208. In other illustrative examples, surface 250 and surface 252 may have gear-like teeth that engage with corresponding teeth on set of wheels 208 to facilitate positive and substantially smooth movement of set of tracks 210 around set of wheels 208.

In this illustrative example, constraint member 242 and constraint member 244 may be associated with first section 214 of base 204. Constraint member 242 and constraint member 244 may take the form of counter rollers 248 in this illustrative example.

Constraint member 242 and constraint member 244 may be used to place pressure on first track 220 and second track 222, respectively, to help reduce undesired slack in first track 220 and second track 222 during movement of robotic vehicle 200. Further, constraint member 242 may help maintain contact between first track 220 and wheel 228 and between first track 220 and wheel 230. Similarly, constraint member 244 may help maintain contact between second track 222 and wheel 232 and between second track 222 and wheel 234.

In this illustrative example, guidance system 206 may include laser device 246. Laser device 246 may be an example of one implementation for laser device 152 in FIG. 1. Laser device 246 may be a laser range measurement device in this illustrative example. Laser device 246 may be used to help guide the movement of robotic vehicle 200 when robotic vehicle 200 is moving through a space (not shown).

Although not shown in this illustrative example, any number of tools, such as number of tools 106 described in FIG. 1, may be associated with base 204 of robotic vehicle 200. These tools may be used to perform any number of operations.

Figure 3:
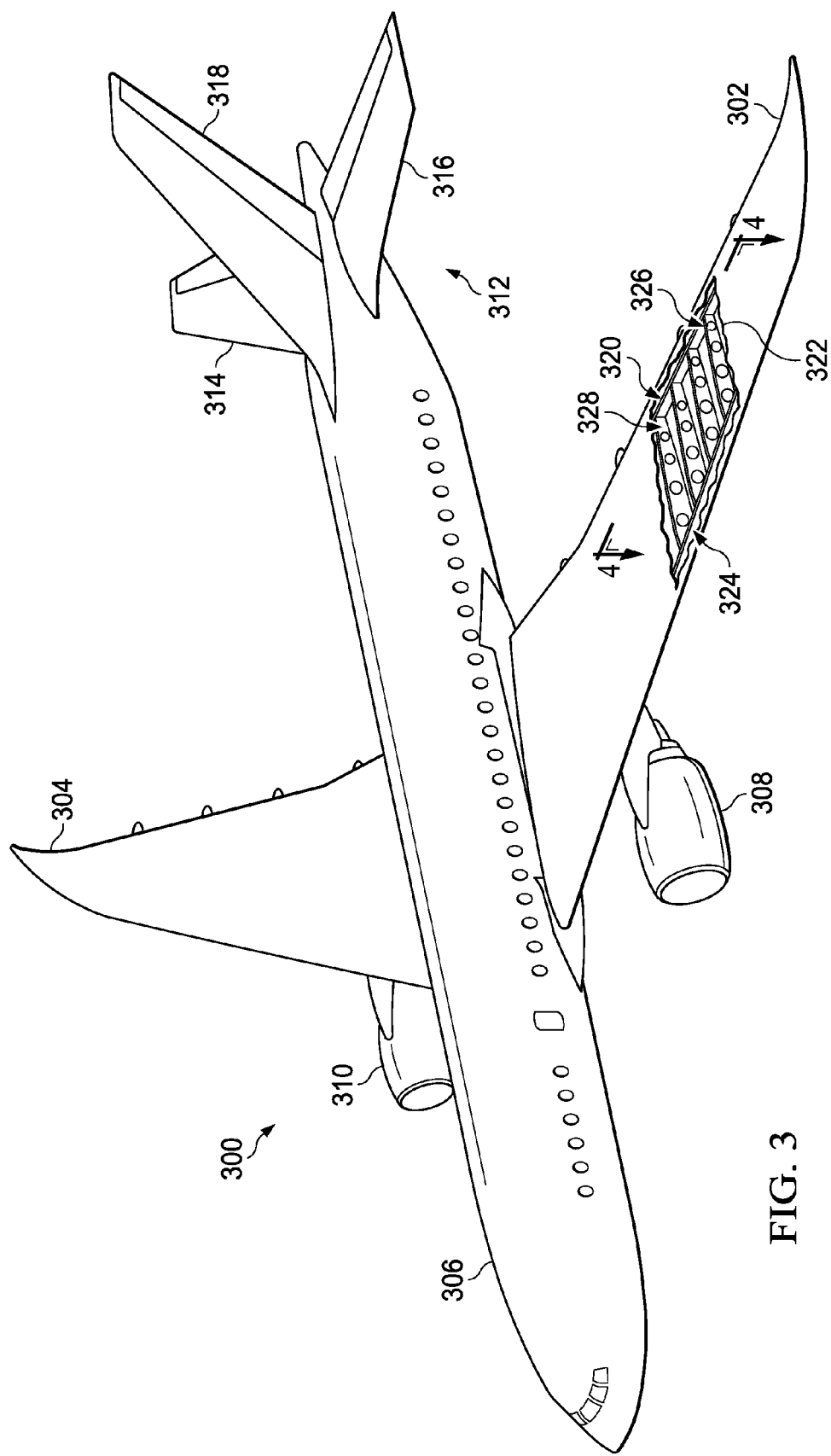
FIG. 3 is an illustration of an isometric view of an aircraft in accordance with an illustrative embodiment.

With reference now to FIG. 3, an illustration of an isometric view of an aircraft is depicted in accordance with an illustrative embodiment. In this illustrative example, aircraft 300 may be an example of one implementation for aircraft 114 in FIG. 1.

As depicted, aircraft 300 may include wing 302 and wing 304 attached to fuselage 306. Aircraft 300 may include engine 308 attached to wing 302 and engine 310 attached to wing 304. Fuselage 306 may have tail section 312. Horizontal stabilizer 314, horizontal stabilizer 316, and vertical stabilizer 318 are attached to tail section 312 of fuselage 306.

In this illustrative example, wing 302 is shown partially cutaway such that wing box 320 of wing 302 may be seen. Wing box 320 may be an example of one implementation for wing box 113 in FIG. 1. Wing box 320 includes upper skin panels 322, lower skin panels (not shown), spars 324, ribs 326, and stringers (not shown in this view). The stringers (not shown in this view) may be associated with upper skin panels 322 and the lower skin panels (not shown) of wing 302.

Further, ribs 326 of wing box 320 may form plurality of wing bays 328. Each of plurality of wing bays 328 may be an example of one implementation for space 108 in FIG. 1.

Figure 4:
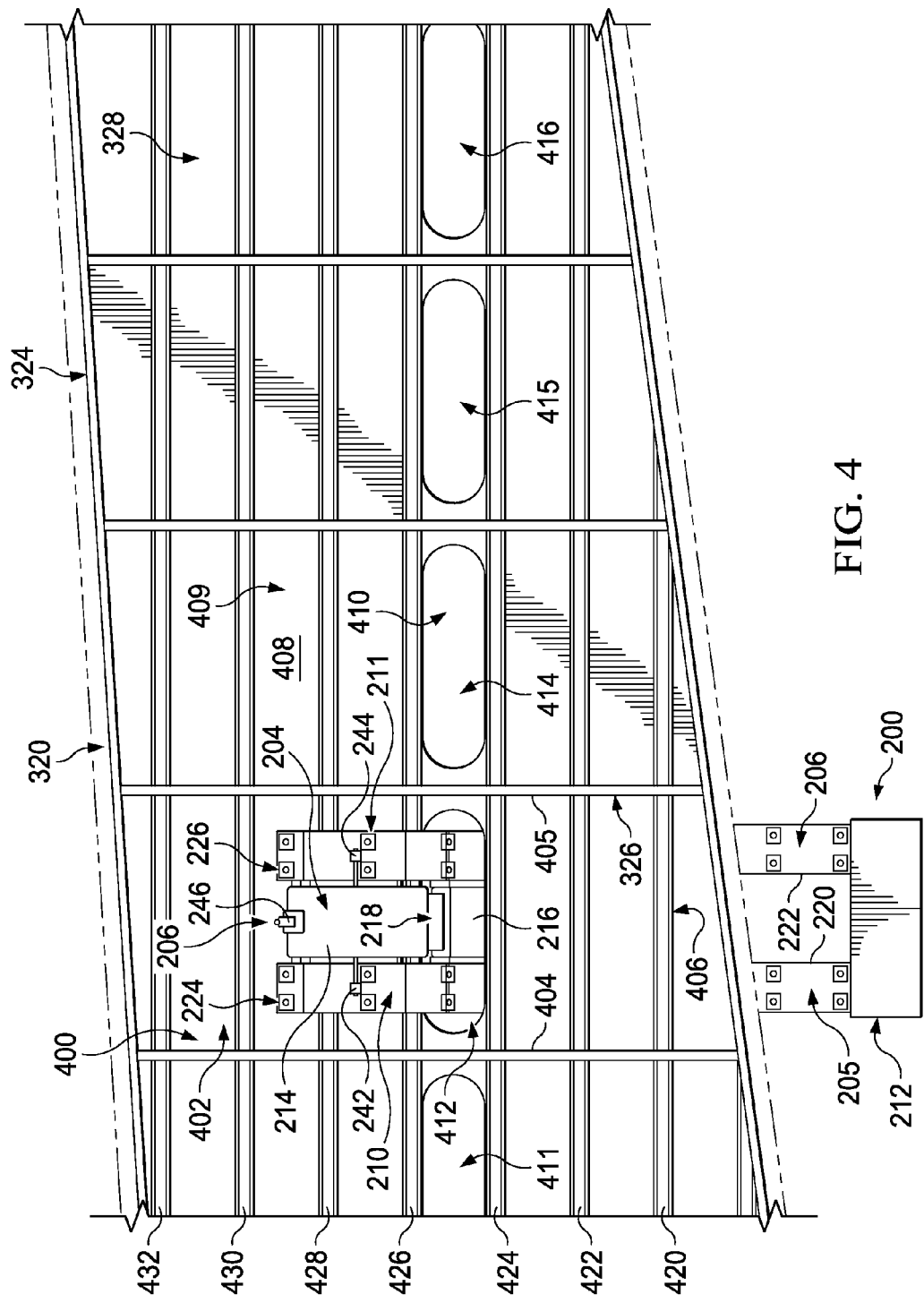
FIG. 4 is an illustration of a top view of a robotic vehicle positioned inside one of a plurality of wing bays of a wing in accordance with an illustrative embodiment.

With reference now to FIG. 4, an illustration of a top view of robotic vehicle 200 from FIG. 2 positioned inside one of plurality of wing bays 328 of wing 302 from FIG. 3 is depicted in accordance with an illustrative embodiment. As depicted, robotic vehicle 200 is positioned within interior 400 of wing box 320. In particular, robotic vehicle 200 is shown positioned wing bay 402 of plurality of wing bays 328. Wing bay 402 may be the portion of interior 400 between rib 404 and rib 405.

Stringers 406 may be present within wing box 320. Stringers 406 may be attached to surface 408, which may be formed by lower skin panels 409. Ribs 326 may be positioned over stringers 406. Stringers 406 may be an example of one implementation for number of structural members 126 in FIG. 1. In particular, stringers 406 may be an example of one implementation for number of stringers 127 in FIG. 1.

As depicted, wing box 320 may have plurality of access openings 410 that allow access into interior 400 of wing box 320. Plurality of access openings 410 includes access opening 411, access opening 412, access opening 414, access opening 415, and access opening 416.

In this illustrative example, robotic vehicle 200 may enter wing bay 402 through access opening 412. Track deployment unit 212 may remain outside of wing box 320 during the movement of robotic vehicle 200 through wing bay 402.

As depicted, stringers 406 may include stringers 420, 422, 424, 426, 428, 430, and 432. Stringers 420, 422, 424, 426, 428, 430, and 432 may pass through wing bay 402.

In this illustrative example, robotic vehicle 200 has been interfaced with stringer 426 and stringer 428 using a portion of attachment units 211 associated with set of tracks 210. Set of tracks 210 and attachment units 211 may improve the ease and speed with which robotic vehicle 200 can move through wing bay 402. In particular, set of tracks 210 and attachment units 211 may enable robotic vehicle 200 to be moved over stringers 406 without being obstructed by stringers 406.

Although not shown in this illustrative example, any number of tools, such as number of tools 106 in FIG. 1, may be associated with base 204 of robotic vehicle 200. These tools may be used to perform any number of operations within wing bay 402.

Figure 5:
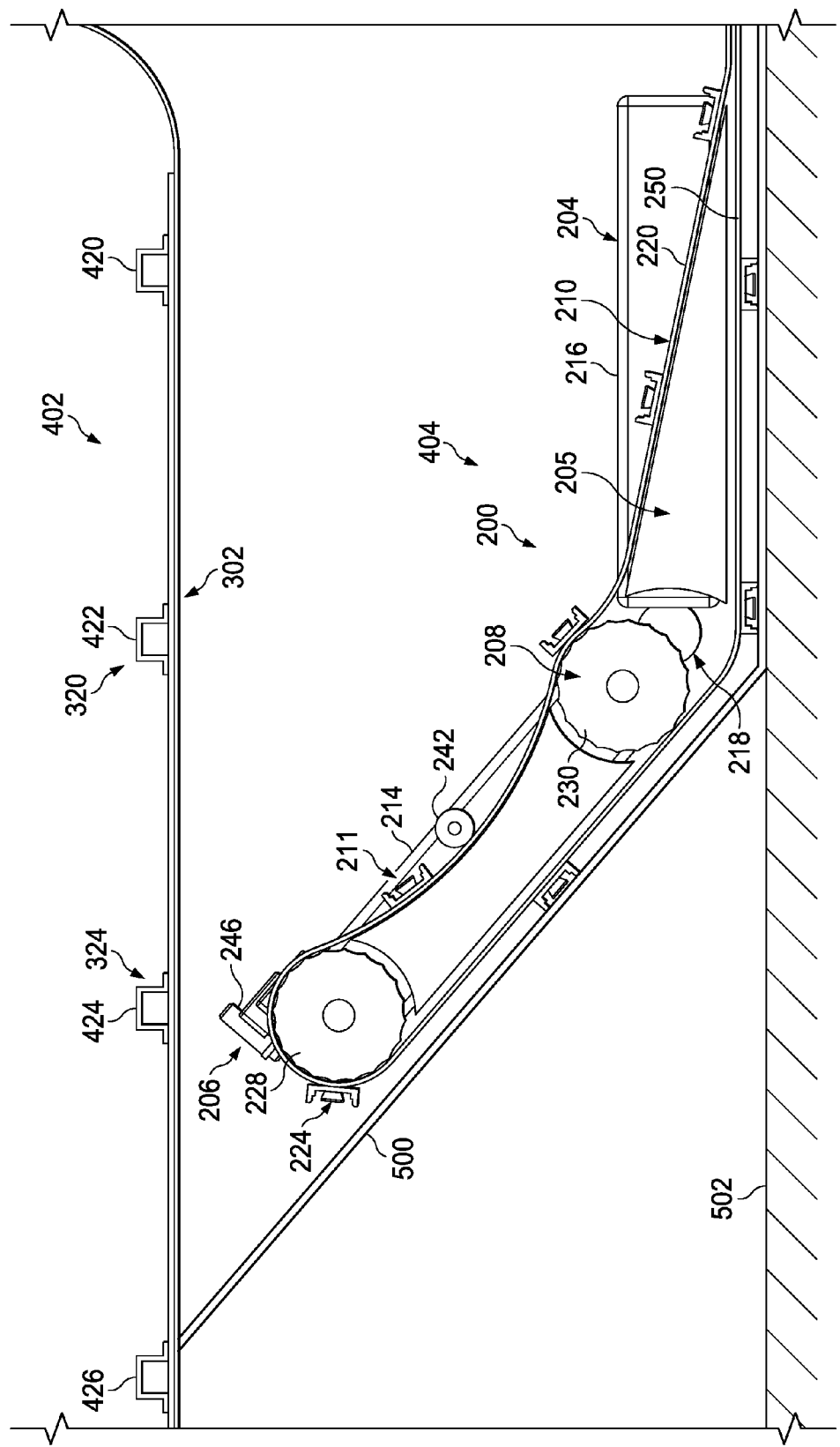
FIG. 5 is an illustration of a side view of a robotic vehicle moving up a ramp towards a wing box in accordance with an illustrative embodiment.

With reference now to FIG. 5, an illustration of a side view of robotic vehicle 200 from FIG. 2 moving up a ramp towards wing box 320 from FIGS. 3-4 in accordance with an illustrative embodiment. As depicted, ramp 500 has been positioned between floor 502 and wing 302.

Ramp 500 is positioned such that robotic vehicle 200 may move up ramp 500 and into wing bay 402 through access opening 412 (not shown in this view) from FIG. 4. Interface 418 provides base 204 with the flexibility needed for robotic vehicle 200 to move onto and up ramp 500.

With reference now to FIGS. 6-10, an illustration of a process for moving robotic vehicle 200 from FIGS. 4-5 through wing bay 402 of wing box 320 from FIG. 4 are depicted in accordance with an illustrative embodiment. In particular, robotic vehicle 200 is depicted entering and moving through wing bay 402 in FIGS. 6-8. Robotic vehicle 200 is depicted moving out of wing bay 402 in FIGS. 9-10.

Figure 6:
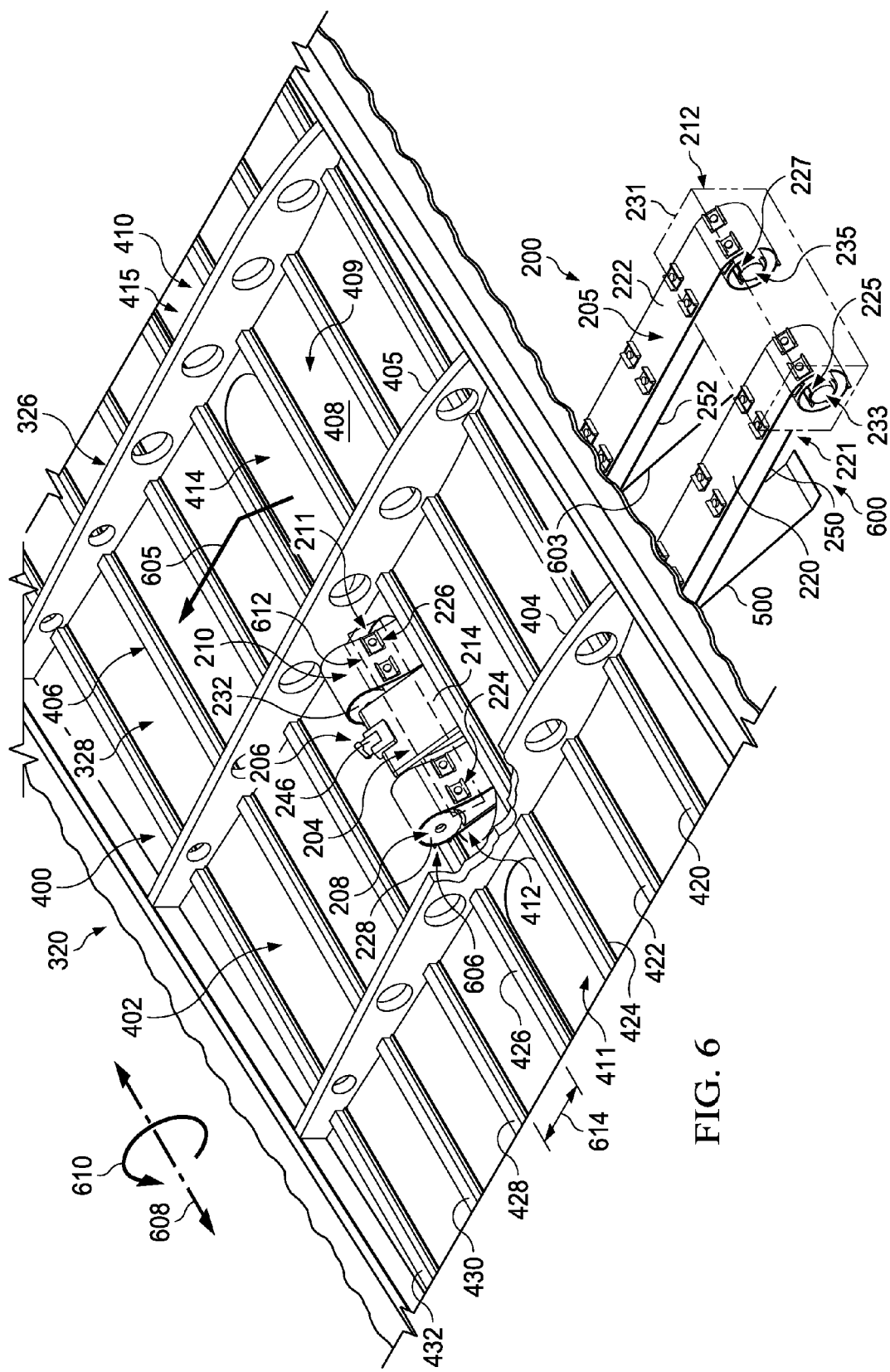
FIG. 6 is an illustration of an isometric view of a robotic vehicle entering a wing bay in accordance with an illustrative embodiment.

Turning now to FIG. 6, an illustration of an isometric view of robotic vehicle 200 entering wing bay 402 is depicted in accordance with an illustrative embodiment. In this illustrative example, robotic vehicle 200 may move up ramp system 600 to enter wing bay 402. As depicted, ramp system 600 may include ramp 500 from FIG. 5 and ramp 603.

Robotic vehicle 200 may enter wing bay 402 through access opening 412 between rib 404 and rib 405. In this illustrative example, robotic vehicle 200 may first encounter stringer 426 when robotic vehicle 200 enters wing bay 402. As robotic vehicle 200 enters wing bay 402 and continues to move in forward direction 605, first portion 606 of attachment units 211 may align with stringer 426. As robotic vehicle 200 moves even farther, this first portion 606 of attachment units 211 may secure set of tracks 210 to stringer 426. In other words, first portion 606 of attachment units 211 may engage stringer 426.

In particular, set of wheels 208 may rotate about an axis substantially parallel to axis 608 in the direction of arrow 610 to move base 204 of robotic vehicle 200 in forward direction 605. This rotational movement of set of wheels 208 may cause set of tracks 210 to deploy from track deployment unit 212.

As set of wheels 208 rotate in the direction of arrow 610, set of tracks 210 may move around wheel 228 and wheel 232. In this manner, set of tracks 210 may be laid down over stringers 406 as robotic vehicle 200 traverses through wing bay 402. In some illustrative examples, the surface of each of set of tracks 210 that comes into contact with set of wheels 208 may be comprised of a friction material that helps facilitate a substantially smooth movement of set of tracks 210 around set of wheels 208.

As robotic vehicle 200 moves farther within wing bay 402, set of tracks 210 may be further deployed such that second portion 612 of attachment units 211 moves around set of wheels 208 until second portion 612 engages stringer 428. Second portion 612 of attachment units 211 may be spaced apart from first portion 606 of attachment units 211 by substantially the same distance as distance 614 between stringer 426 and stringer 428.

Figure 7:
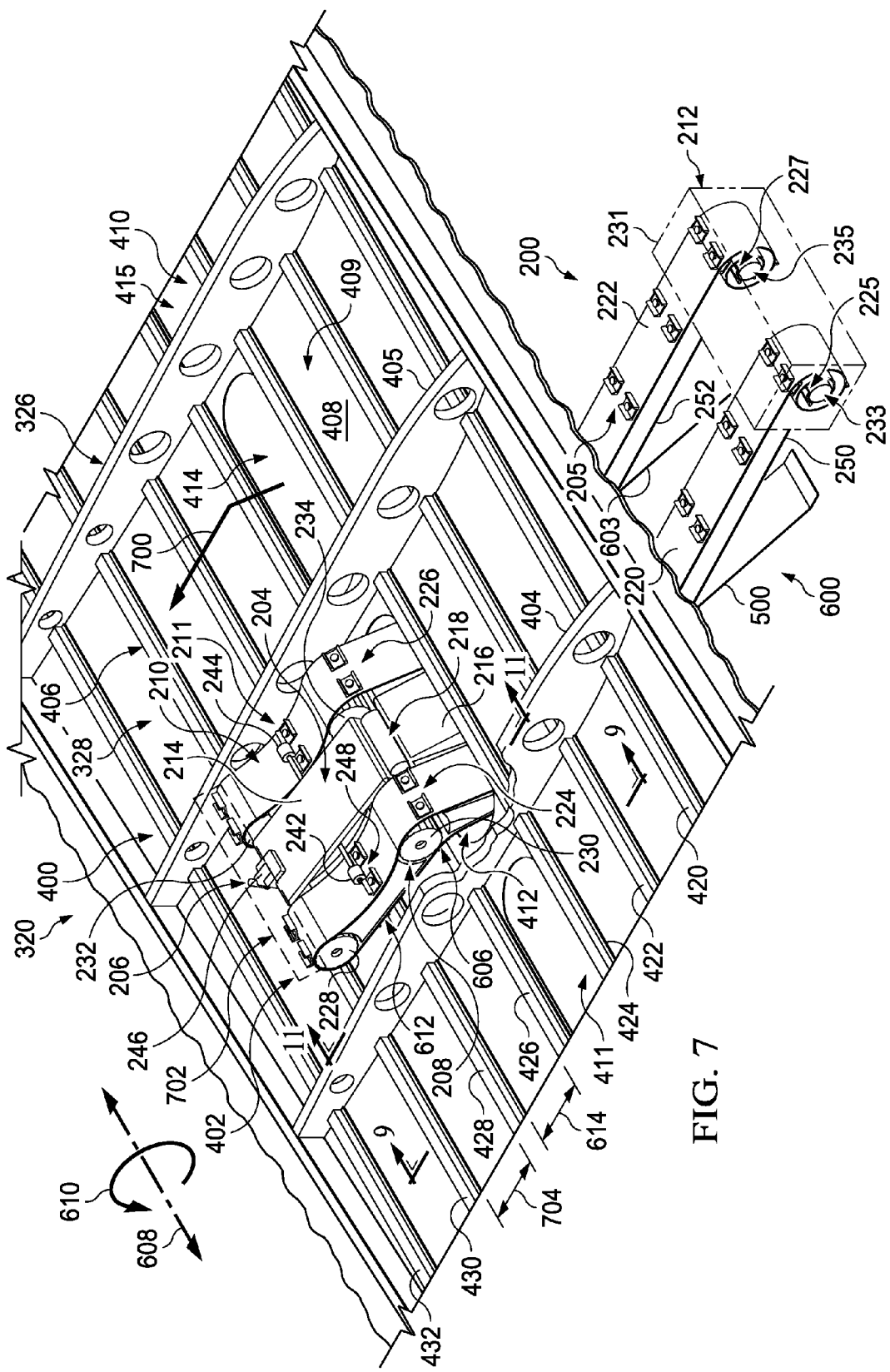
FIG. 7 is an illustration of an isometric view of a robotic vehicle positioned farther inside a wing bay in accordance with an illustrative embodiment.

With reference now to FIG. 7, an illustration of an isometric view of robotic vehicle 200 positioned farther inside wing bay 402 is depicted in accordance with an illustrative embodiment. In this illustrative example, robotic vehicle 200 has moved in forward direction 700 into and within wing bay 402.

As depicted, more of each of set of tracks 210 has deployed from track deployment unit 212. In this illustrative example, second portion 612 of attachment units 211 may align with and engage stringer 428 to secure set of tracks 210 to stringer 428. First portion 606 of attachment units 211 may remain engaged with and secured to stringer 426 during the further deployment of set of tracks 210 in forward direction 700.

As robotic vehicle 200 moves farther within wing bay 402, third portion 702 of attachment units 211 may engage stringer 430. Third portion 702 of attachment units 211 may be spaced apart from second portion 612 of attachment units 211 by substantially the same distance as distance 704 between stringer 428 and stringer 430.

In this illustrative example, first portion 606 and second portion 612 of attachment units 211 may support and stabilize robotic vehicle 200 relative to wing box 320 such that robotic vehicle 200 may move through wing bay 402 easily and substantially smoothly. Further, first portion 606 and second portion 612 of attachment units 211 may support and stabilize robotic vehicle 200 during further deployment of set of tracks 210 until third portion 702 can also contribute to this support and stabilization by engaging stringer 430.

Figure 8:
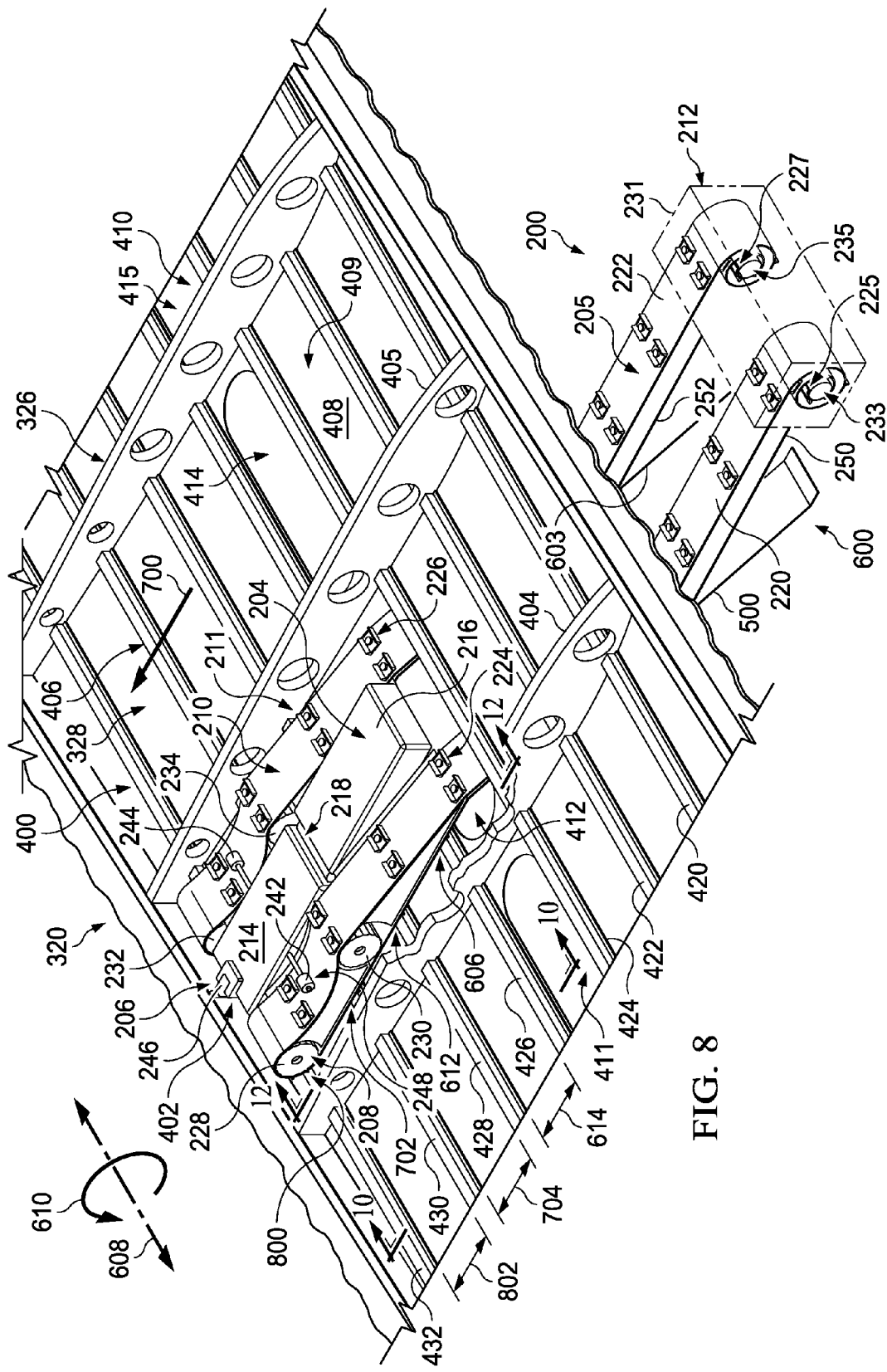
FIG. 8 is an illustration of an isometric view of a robotic vehicle positioned still farther inside a wing bay in accordance with an illustrative embodiment.

With reference now to FIG. 8, an illustration of an isometric view of robotic vehicle 200 positioned still farther inside wing bay 402 is depicted in accordance with an illustrative embodiment. In this illustrative example, robotic vehicle 200 has moved farther in forward direction 700 within wing bay 402.

As depicted, more of each of set of tracks 210 has deployed from track deployment unit 212. In this illustrative example, third portion 702 of attachment units 211 has aligned with and engaged stringer 430 to secure set of tracks 210 to stringer 430. First portion 606 and second portion 612 of attachment units 211 may remain engaged with and secured to stringer 426 and stringer 428, respectively.

In this illustrative example, robotic vehicle 200 may continue to move far enough within wing bay 402 such that fourth portion 800 of attachment units 211 may align with and engage stringer 432. Fourth portion 800 of attachment units 211 may be spaced apart from third portion 702 of attachment units 211 by substantially the same distance as distance 802 between stringer 430 and stringer 432.

The engaging of first portion 602 of attachment units 211 with stringer 426, which is followed by the engaging of second portion 612 of attachment units 211 with stringer 428, which is then followed by the engaging of third portion 702 of attachment units 211 with stringer 430, which may then be followed by the engaging of fourth portion 800 of attachment units 211 with stringer 432, may be an example of one implementation for at least a portion of a forward sequence of engagement, such as forward sequence 144 in FIG. 1. In other words, first portion 602, second portion 612, third portion 702, and fourth portion 800 of attachment units 211 may engage stringer 426, stringer 428, stringer 430, and stringer 432 successively as robotic vehicle 200 traverses wing bay 402.

While engaged with stringer 426, stringer 428, stringer 430, and stringer 432, robotic vehicle 200 may be used to perform one or more operations. For example, without limitation, robotic vehicle 200 may have a number of tools (not shown) that may be used to perform one or more operations while robotic vehicle 200 is in this position. In some illustrative examples, robotic vehicle 200 may perform one or more operations at various positions within wing bay 402. For example, without limitation, robotic vehicle 200 may stop and start movement through wing bay 402 one or more times to perform various operations. The different types of operations that may be performed may include, for example, without limitation, at least one of a drilling operation, a fastening operation, a testing operation, an imaging operation, a sealing operation, a repair operation, a maintenance operation, or some other type of operation.

When robotic vehicle 200 is moved out of wing bay 402, any attachment units engaged with any of stringers 406 may be disengaged in a reverse sequence. For example, without limitation, fourth portion 800, third portion 702, second portion 612, and then first portion 602 of attachment units 211 may disengage from stringer 432, stringer 430, stringer 428, and stringer 426, respectively, and in this successive order.

Figure 9:
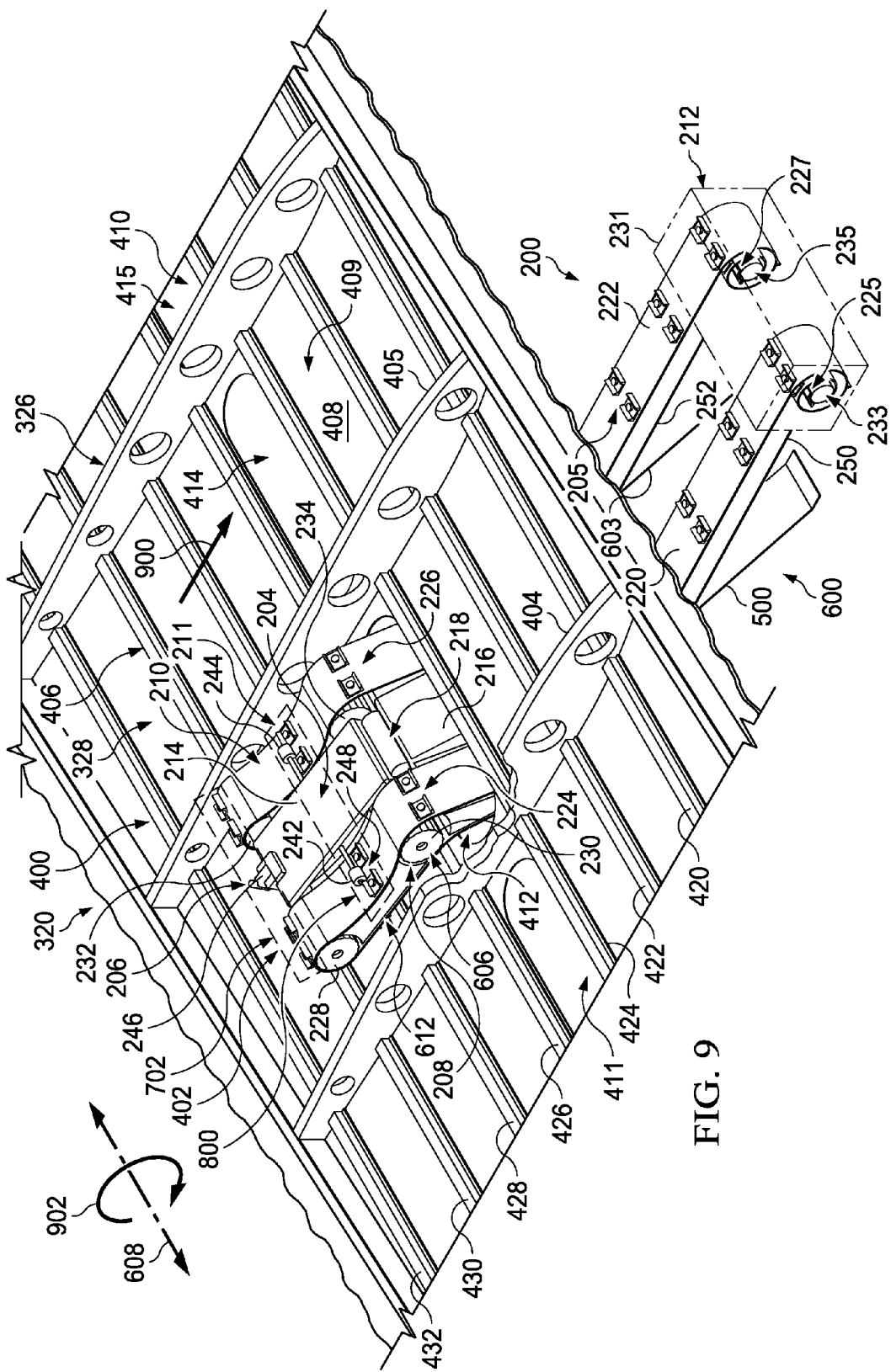
FIG. 9 is an illustration of an isometric view of a robotic vehicle moving in a reverse direction through a wing bay in accordance with an illustrative embodiment.

With reference now to FIG. 9, an illustration of an isometric view of robotic vehicle 200 moving in a reverse direction through wing bay 402 is depicted in accordance with an illustrative embodiment. In this illustrative example, robotic vehicle 200 has moved in reverse direction 900.

In particular, set of wheels 208 may rotate about an axis that is substantially parallel to axis 608 in the direction of arrow 902 to move base 204 of robotic vehicle 200 in reverse direction 900. As robotic vehicle 200 moves in reverse direction 900, any attachment units securing set of tracks 210 to any of stringers 426 may be disengaged in a reverse sequence that is the reverse of the manner in which these attachment units were engaged with these stringers.

For example, as depicted, fourth portion 800 of attachment units 211 has disengaged from stringer 432. Third portion 702 of attachment units 211 has disengaged from stringer 430.

Further, as robotic vehicle 200 moves in reverse direction 900, set of tracks 210 may be retracted back into track deployment unit 212. In particular, as robotic vehicle 200 moves in reverse direction 900, a portion of first track 220 is wound back around reel 233 and a portion of second track 222 is wound back around reel 235.

In other words, moving robotic vehicle 200 in reverse direction 900 may reduce the load being placed on the biasing system (not shown) located inside track deployment unit 212. This reduction in load may cause set of tracks 210 to be retracted due to the tension with which this biasing system (not shown) is holding set of tracks 210.

As robotic vehicle 200 moves farther in reverse direction 900, second portion 612 of attachment units 211 may be the next portion of attachment units 211 to be disengaged from one of stringer 428. First portion 606 may then follow by disengaging from stringer 426.

Figure 10:
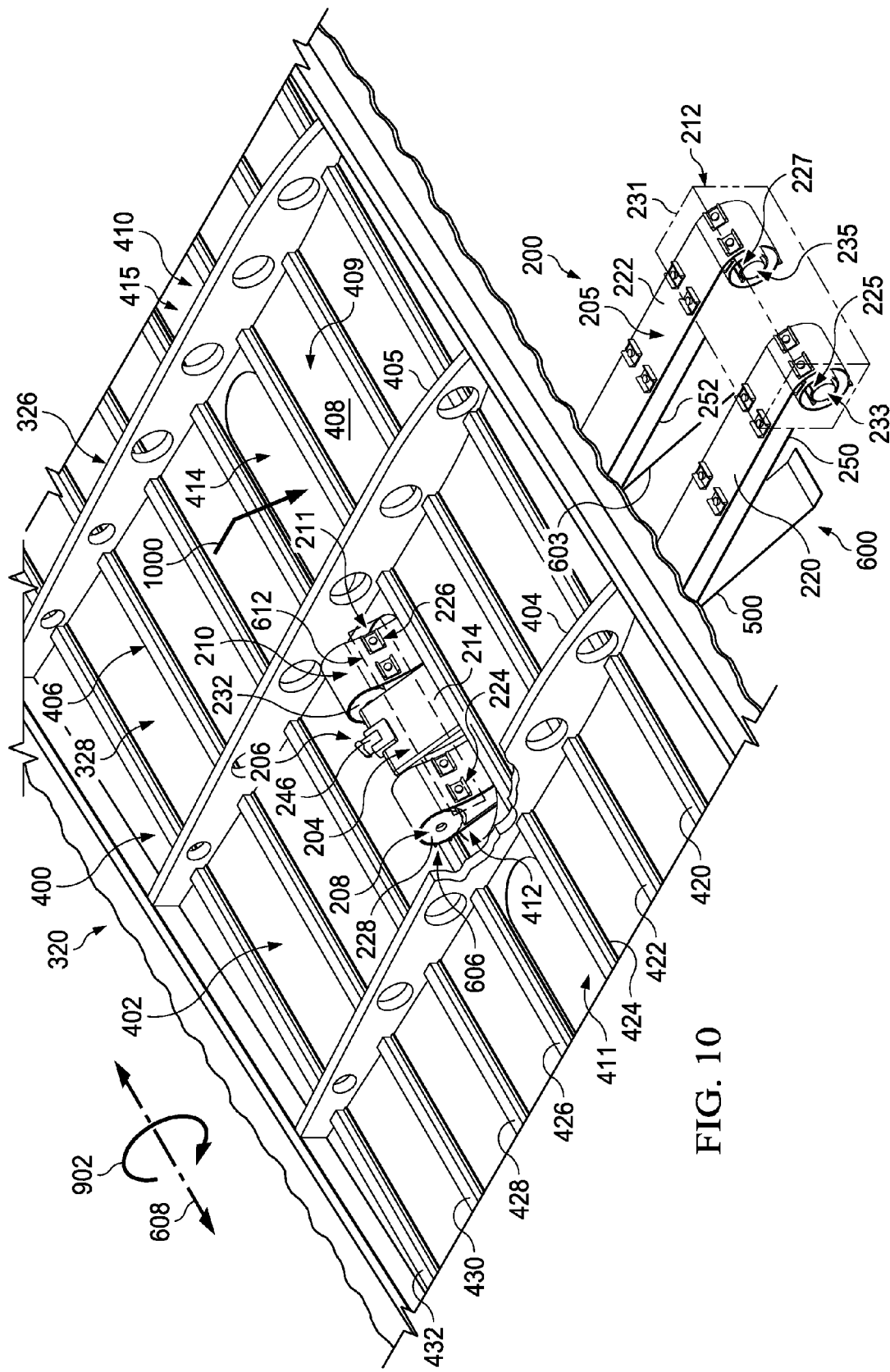
FIG. 10 is an illustration of an isometric view of a robotic vehicle moving out of a wing bay in accordance with an illustrative embodiment.

With reference now to FIG. 10, an illustration of an isometric view of robotic vehicle 200 moving out of wing bay 402 is depicted in accordance with an illustrative embodiment. In this illustrative example, robotic vehicle 200 may move in reverse direction 1000 to exit wing bay 402.

As depicted, second portion 612 of attachment units 211 has been disengaged from stringer 428 and more of set of tracks 210 has been retracted into track deployment unit 212. Further, first portion 606 of attachment units 211 has been partially disengaged from stringer 426. As robotic vehicle 200 exits wing bay 402 and moves down ramp system 600, first portion 606 of attachment units 211 may fully disengage from stringer 426.

Figure 11:
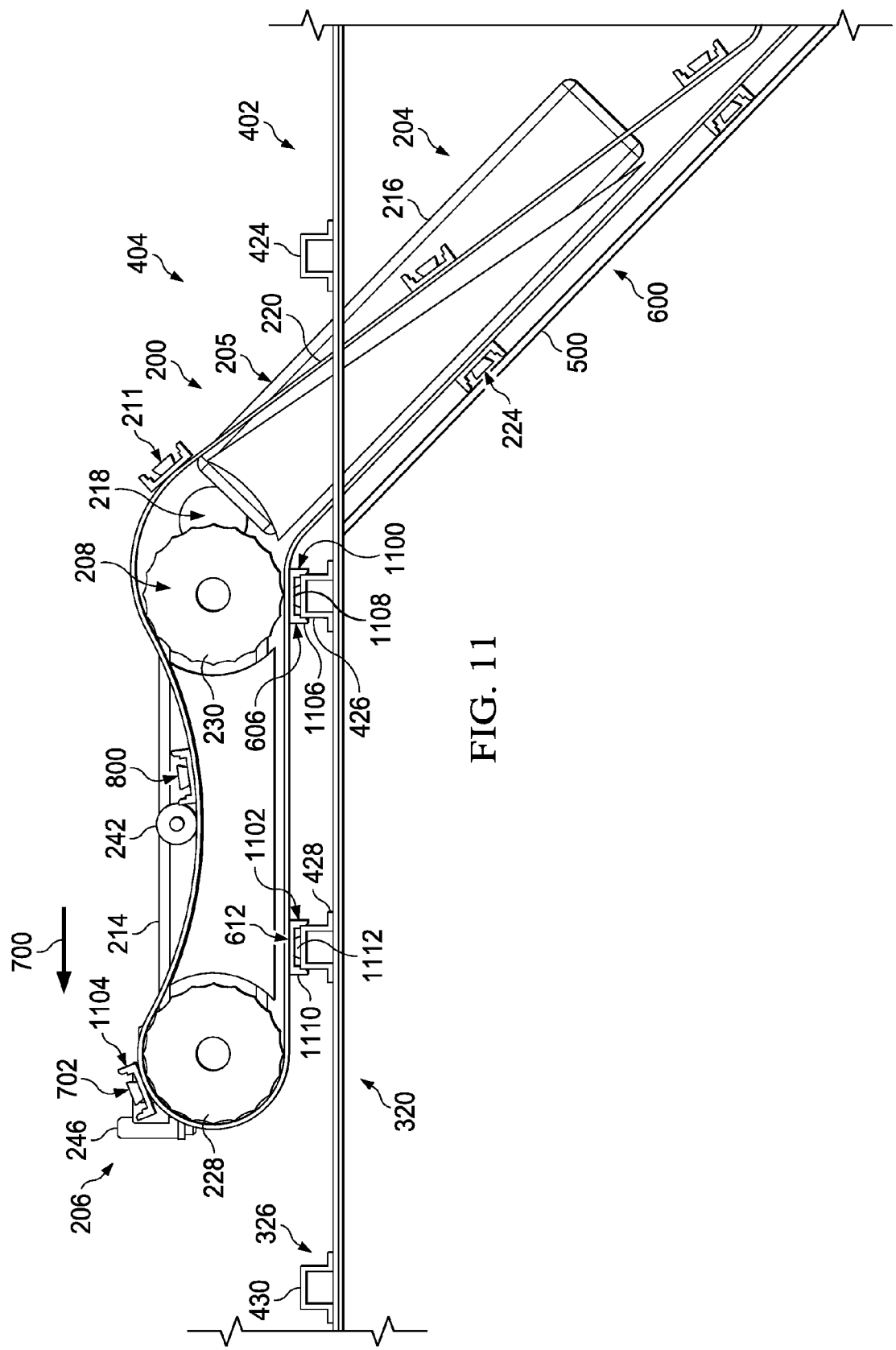
FIG. 11 is an illustration of a side view of a robotic vehicle secured to a stringer and another stringer of wing box in accordance with an illustrative embodiment.

With reference now to FIG. 11, an illustration of a side view of robotic vehicle 200 secured to stringer 426 and stringer 428 of wing box 320 from FIG. 7 is depicted in accordance with an illustrative embodiment. In this illustrative example, a side view of robotic vehicle 200 positioned within wing bay 402 is depicted in the direction of lines 11-11 in FIG. 7.

First portion 606 and second portion 612 of attachment units 211 have secured set of tracks 210 to stringer 426 and stringer 428, respectively. As depicted, first portion 606 of attachment units 211 may include attachment unit 1100. Second portion 612 of attachment units 211 may include attachment unit 1102. Further, third portion 702 of attachment units 211 may include attachment unit 1104. Attachment unit 1100, attachment unit 1102, and attachment unit 1104 may each be an example of one implementation for attachment unit 130 in FIG. 1.

Attachment unit 1100 may include base element 1106 and securing element 1108. In this illustrative example, securing element 1108 may take the form a suction cup that adheres to stringer 426. Similarly, attachment unit 1102 may include base element 1110 and securing element 1112. In this illustrative example, securing element 1112 may also take the form of a suction cup that adheres to stringer 428.

Figure 12:
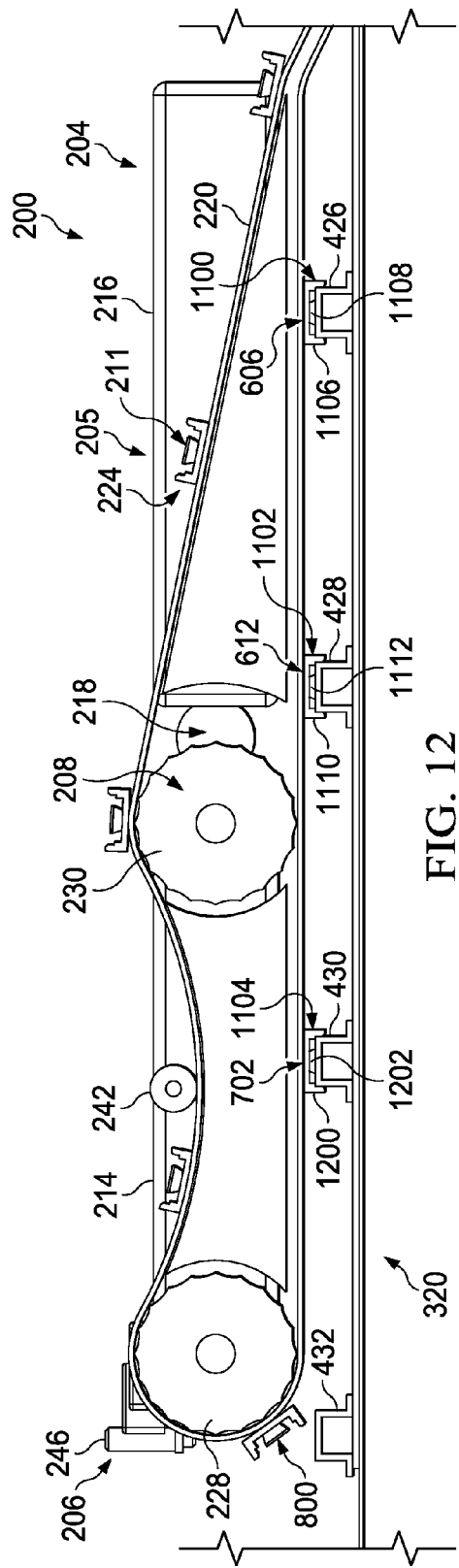
FIG. 12 is an illustration of a side view of a robotic vehicle secured to a stringer, another stringer, and yet another stringer of a wing box in accordance with an illustrative embodiment.

With reference now to FIG. 12, an illustration of a side view of robotic vehicle 200 secured to stringer 426, stringer 428, and stringer 430 of wing box 320 from FIG. 11 is depicted in accordance with an illustrative embodiment. In this illustrative example, a side view of robotic vehicle 200 positioned within wing bay 402 is depicted in the direction of lines 12-12 in FIG. 8.

First portion 606, second portion 612, and third portion 702 of attachment units 211 have engaged with set of tracks 210. In this manner, first portion 606, second portion 612, and third portion 702 of attachment units 211 secure set of tracks 210 to stringer 426, stringer 428, and stringer 430, respectively. As depicted, attachment unit 1104 has now engaged stringer 430. In this illustrative example, attachment unit 1104 may include base element 1200 and securing element 1202. In this illustrative example, securing element 1202 may take the form a suction cup that adheres to stringer 430.

Figure 13:
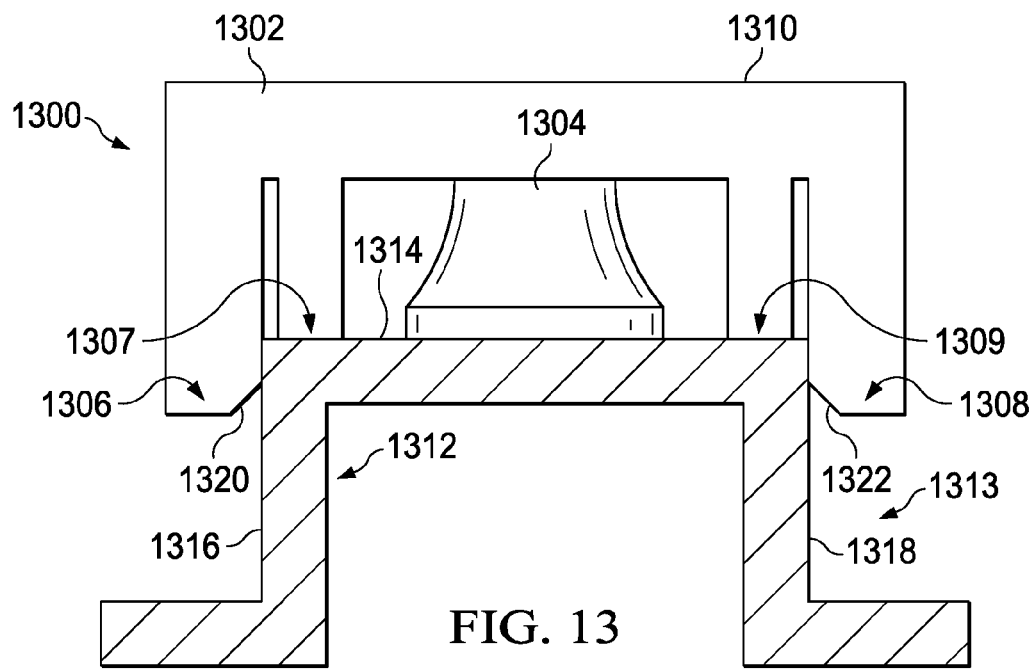
FIG. 13 is an illustration of a side view of an attachment unit in accordance with an illustrative embodiment.
Figure 14:
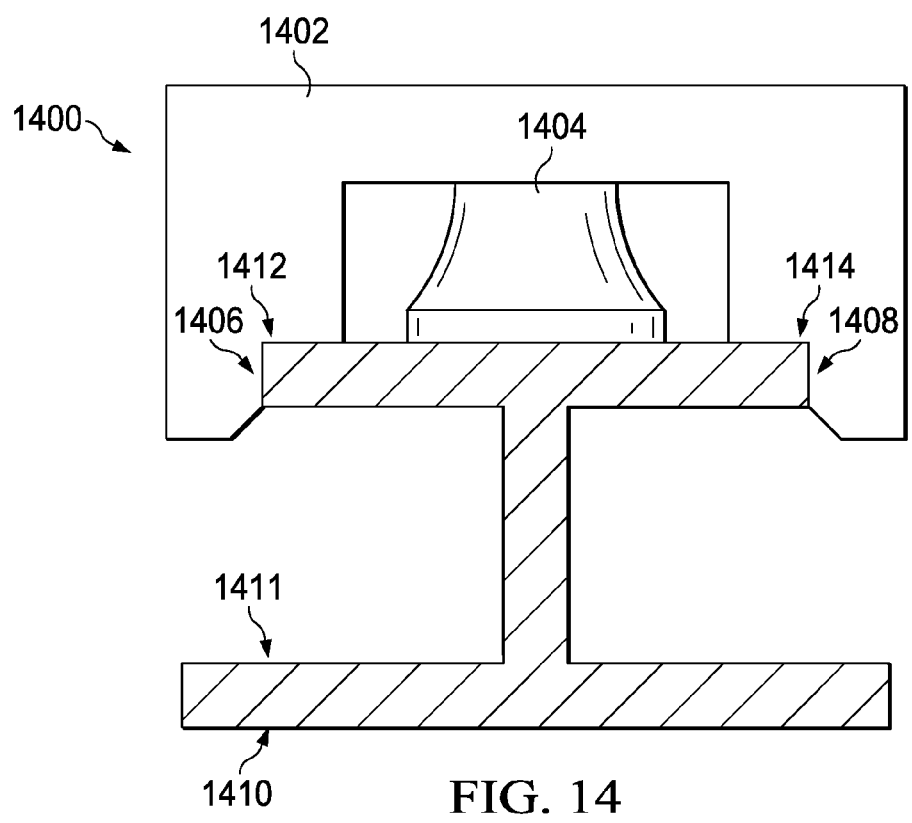
FIG. 14 is an illustration of a side view of another type of attachment unit in accordance with an illustrative embodiment.

Referring now to FIGS. 13-14, illustrations of different types of attachment units are depicted in accordance with an illustrative embodiment. Turning now to FIG. 13, an illustration of a side view of an attachment unit is depicted in accordance with an illustrative embodiment. In this illustrative example, attachment unit 1300 may be an example of one implementation for attachment unit 130 in FIG. 1. As depicted, attachment unit 1300 may include base element 1302 and securing element 1304, which may be examples of implementations for base element 132 and set of securing elements 134, respectively, in FIG. 1.

As depicted, base element 1302 has flanged portion 1306, flanged portion 1307, flanged portion 1308, and flanged portion 1309, which extend from portion 1310. Portion 1310 of base element 1302 may be attached to a track, such as, for example, without limitation, one of first track 220 or second track 222 in FIG. 2.

Attachment unit 1300 may be configured to engage stringer 1312 having cross-sectional shape 1313. Cross-sectional shape 1313 may be a hat-type shape in this illustrative example. As depicted, stringer 1312 includes portion 1314, portion 1316, and portion 1318.

Securing element 1304 may be a suction cup in this illustrative example. Securing element 1304 may contact and attach to portion 1314 of stringer 1312.

Flanged portion 1306 and flanged portion 1308 of base element 1302 may be shaped such that stringer 1312 may be easily engaged. In particular, flanged portion 1306 and flanged portion 1308 may have angled edge 1320 and angled edge 1322, respectively. Angled edge 1320 and angled edge 1322, which may also be referred to as chamfers, may enable base element 1302 to be positioned over and fit over stringer 1312 such that securing element 1304 may attach to portion 1314 of stringer 1312. Further, angled edge 1320 and angled edge 1322 may help guide alignment of base element 1302 with stringer 1312 as base element 1302 is positioned and fit over stringer 1312.

In this manner, base element 1302 may be shaped according to cross-sectional shape 1313 of stringer 1312 to ensure a desired fit between attachment unit 1300 and stringer 1312 when securing element 1304 engages stringer 1312. In this illustrative example, when attachment unit 1300 is fully engaged with and thereby secured to stringer 1312, flanged portion 1306 may contact portion 1316 of stringer 1312, flanged portion 1307 and flanged portion 1309 may contact portion 1314 of stringer 1312, and flanged portion 1308 may contact portion 1318 of stringer 1312. These flanged portions of base element 1302 may stabilize and support attachment unit 1300 with respect to stringer 1312.

Base element 1302 may be comprised of any number of materials that are selected to ensure that contact between base element 1302 and stringer 1312 does not affect stringer 1312 in an undesired manner. For example, without limitation, base element 1302 may be comprised of a plastic material selected to ensure that base element 1302 does not scratch, mar, or otherwise affect stringer 1312 in an undesired manner.

With reference now to FIG. 14, an illustration of a side view of another type of attachment unit is depicted in accordance with an illustrative embodiment. In this illustrative example, attachment unit 1400 may be an example of one implementation for attachment unit 130 in FIG. 1. As depicted, attachment unit 1400 may include base element 1402 and securing element 1404, which may be examples of implementations for base element 132 and set of securing elements 134, respectively, in FIG. 1.

As depicted, base element 1402 has first portion 1406 and second portion 1408. Securing element 1404 may be associated with base element 1402. In this illustrative example, securing element 1404 may be a suction cup. Securing element 1404 may be used to secure attachment unit 1400 to stringer 1410.

In this illustrative example, stringer 1410 may have cross-sectional shape 1411. Cross-sectional shape 1411 may be an I-shape in this illustrative example. First portion 1406 of base element 1402 may be configured to engage and substantially conform to corner 1412 of stringer 1410. Similarly, second portion 1408 of base element 1402 may be configured to engage and substantially conform to corner 1414 of stringer 1410. In this manner, base element 1402 may be shaped in a manner that corresponds to cross-sectional shape 1411 of stringer 1410.

Similar to base element 1302 in FIG. 13, base element 1402 may be comprised of any number of materials that are selected to ensure that contact between base element 1402 and stringer 1410 does not affect stringer 1410 in an undesired manner. For example, without limitation, base element 1402 may be comprised of a plastic material selected to ensure that base element 1402 does not scratch, mar, or otherwise affect stringer 1410 in an undesired manner.

Figure 15:
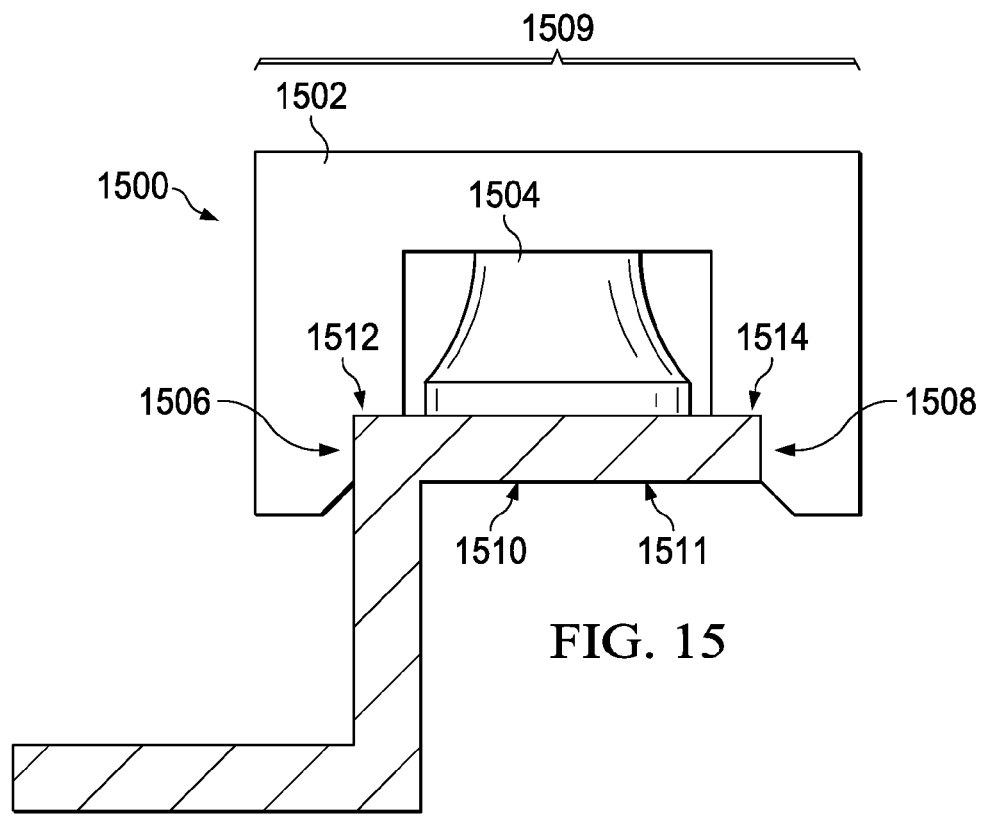
FIG. 15 is an illustration of a side view of yet another type of attachment unit in accordance with an illustrative embodiment.

With reference now to FIG. 15, an illustration of a side view of yet another type of attachment unit is depicted in accordance with an illustrative embodiment. In this illustrative example, attachment unit 1500 may be an example of one implementation for attachment unit 130 in FIG. 1. As depicted, attachment unit 1500 may include base element 1502 and securing element 1504, which may be examples of implementations for base element 132 and set of securing elements 134, respectively, in FIG. 1.

As depicted, base element 1502 may have first portion 1506 and second portion 1508. Securing element 1504, which may be associated with base element 1502, may be a suction cup in this illustrative example. Securing element 1504 may be used to secure attachment unit 1500 to stringer 1510.

In this illustrative example, stringer 1510 may be a Z-type stringer. Portion 1509 of stringer 1510 may have cross-sectional shape 1511. Cross-sectional shape 1511 may be an L-shape in this illustrative example. First portion 1506 of base element 1502 may be configured to engage and substantially conform to corner 1512 of stringer 1510. Similarly, second portion 1508 of base element 1502 may be configured to engage and substantially conform to corner 1514 of stringer 1510. In this manner, base element 1502 may be shaped in a manner that corresponds to cross-sectional shape 1511 of stringer 1510.

Similar to base element 1302 in FIG. 13 and base element 1402 in FIG. 14, base element 1502 may be comprised of any number of materials that are selected to ensure that contact between base element 1502 and stringer 1510 does not affect stringer 1510 in an undesired manner. For example, without limitation, base element 1502 may be comprised of a plastic material selected to ensure that base element 1502 does not scratch, mar, or otherwise affect stringer 1510 in an undesired manner.

Figure 16:
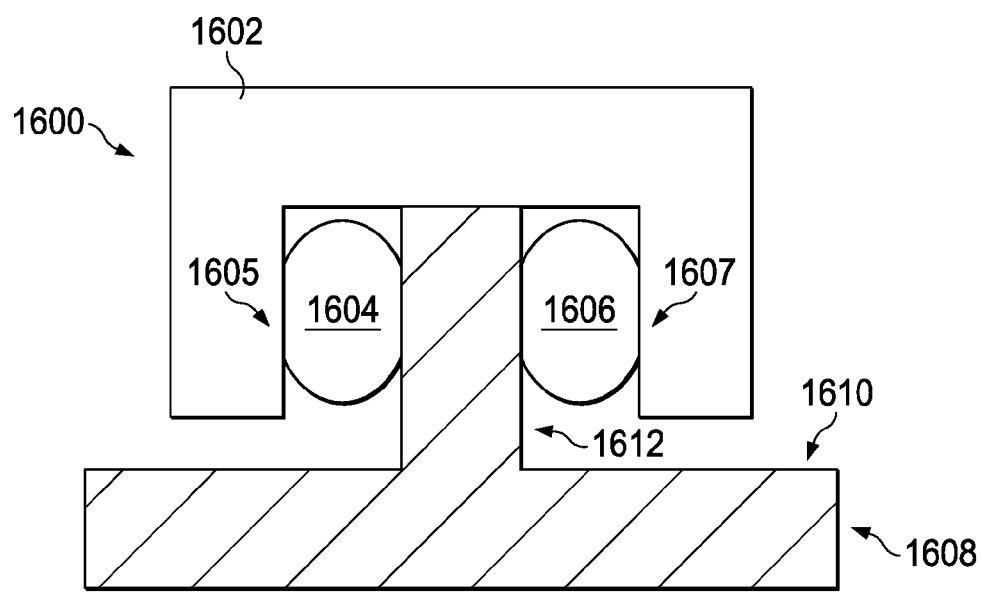
FIG. 16 is an illustration of a side view of another type of attachment unit in accordance with an illustrative embodiment.

With reference now to FIG. 16, an illustration of a side view of another type of attachment unit is depicted in accordance with an illustrative embodiment. In this illustrative example, attachment unit 1600 may be an example of one implementation for attachment unit 130 in FIG. 1.

As depicted, attachment unit 1600 may include base element 1602, securing element 1604, and securing element 1606. Base element may be an example of one implementation for base element 132 in FIG. 1.

Securing element 1604 and securing element 1606 may be an example of one implementation for set of securing elements 134, respectively, in FIG. 1.

Securing element 1604 and securing element 1606 may be used to secure attachment unit 1600 to stringer 1608, which may be a blade-type stringer. Stringer 1608 may have cross-sectional shape 1610. Cross-sectional shape 1610 may be a T-shape in this illustrative example.

Securing element 1604 and securing element 1606 may be attached to flanged portion 1605 and flanged portion 1607, respectively. Further, securing element 1604 and securing element 1606 may be comprised of an elastomeric material. Positioning base element 1602 over stringer 1608 and applying force to base element 1602 in a direction towards stringer 1608 may enable securing element 1604 and securing element 1606 to form an interference-type fit between attachment unit 1600 and portion 1612 of stringer 1608.

In other illustrative examples, securing element 1604 and securing element 1606 may take the form of bladders. These bladders may be expanded with compressed air or some other type of fluid to form an interference-type fit between attachment unit 1600 and portion 1612 of stringer 1608.

Similar to base element 1302 in FIG. 13, base element 1402 in FIG. 14, and base element 1502 in FIG. 15, base element 1602 may be comprised of any number of materials that are selected to ensure that contact between base element 1602 and stringer 1608 does not affect stringer 1608 in an undesired manner. For example, without limitation, base element 1602 may be comprised of a plastic material selected to ensure that base element 1602 does not scratch, mar, or otherwise affect stringer 1608 in an undesired manner.

In this manner, attachment units may have a number of different configurations. Although not depicted in FIGS. 13-16, some attachment units may be adapted for use with C-section stringers or stiffeners or other types of structural members having other types of cross-sectional shapes.

The illustrations of robotic vehicle 200 in FIGS. 2 and 4-12, attachment unit 1300 in FIG. 13, attachment unit 1400 in FIG. 14, attachment unit 1500 in FIG. 15, and attachment unit 1600 in FIG. 16 are not meant to imply physical or architectural limitations to the manner in which an illustrative embodiment may be implemented. Other components in addition to or in place of the ones illustrated may be used. Some components may be optional.

The different components shown in FIGS. 2 and 4-16 may be illustrative examples of how components shown in block form in FIG. 1 can be implemented as physical structures. Additionally, some of the components in FIGS. 2 and 4-16 may be combined with components in FIG. 1, used with components in FIG. 1, or a combination of the two.

Figure 17:
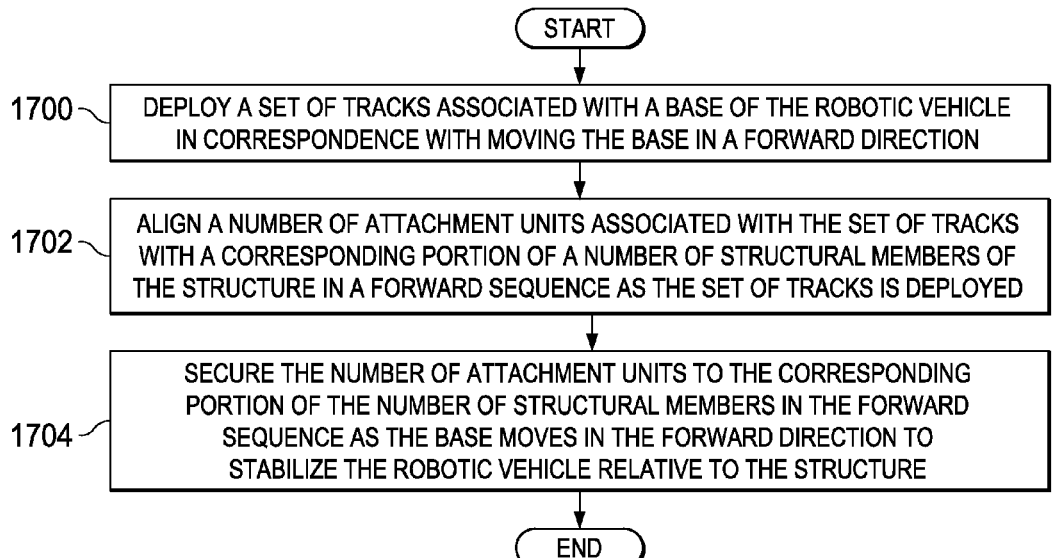
FIG. 17 is an illustration of a process for moving robotic vehicles relative to a structure in the form of a flowchart in accordance with an illustrative embodiment.

With reference now to FIG. 17, an illustration of a process for moving a robotic vehicle relative to a structure is depicted in the form of a flowchart in accordance with an illustrative embodiment. The process illustrated in FIG. 17 may be implemented to move robotic vehicle 102 in FIG. 1 relative to structure 112 in FIG. 1.

The process may begin by deploying a set of tracks associated with a base of the robotic vehicle in correspondence with moving the base in a forward direction (operation 1700). Next, a number of attachment units associated with the set of tracks may be aligned with a corresponding portion of a number of structural members of the structure in a forward sequence as the set of tracks is deployed (operation 1702). The number of attachment units may be secured to the corresponding portion of the number of structural members in the forward sequence as the base moves in the forward direction to stabilize the robotic vehicle relative to the structure (operation 1704), with the process terminating thereafter.

Figure 18:
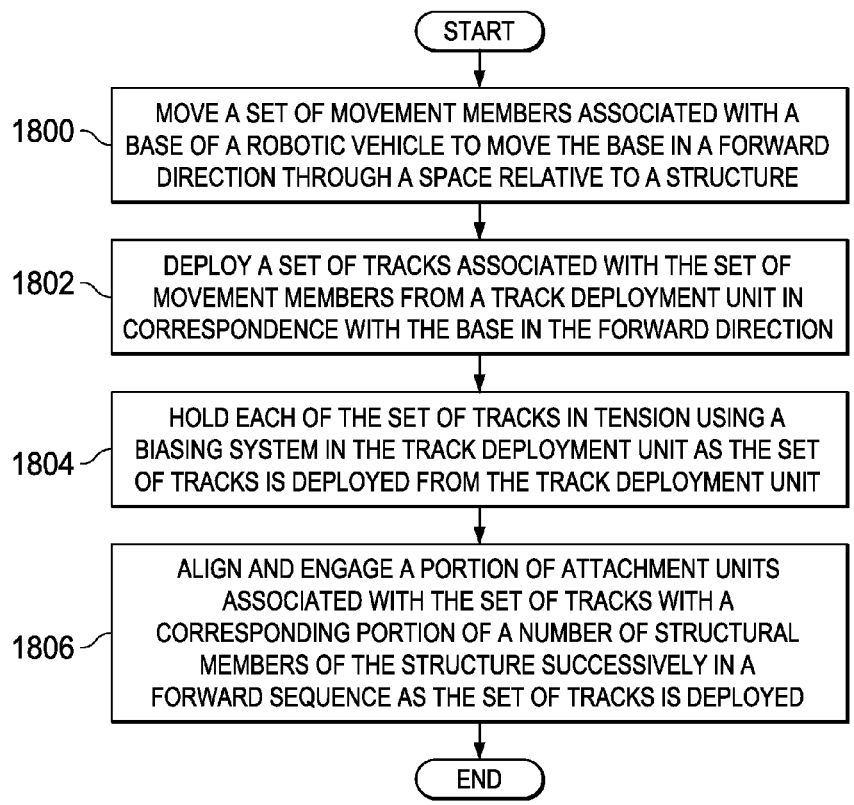
FIG. 18 is an illustration of a process for moving a robotic vehicle through a space relative to a structure in the form of a flowchart in accordance with an illustrative embodiment.

With reference now to FIG. 18, an illustration of a process for moving a robotic vehicle through a space relative to a structure is depicted in the form of a flowchart in accordance with an illustrative embodiment. The process illustrated in FIG. 18 may be implemented to move robotic vehicle 102 from FIG. 1 through space 108 relative to structure 112 in FIG. 1.

The process may begin by moving a set of movement members associated with a base of a robotic vehicle to move the base in a forward direction through a space relative to a structure (operation 1800). A set of tracks associated with the set of movement members may be deployed from a track deployment unit in correspondence with the base in the forward direction (operation 1802).

Each of the set of tracks may be held in tension using a biasing system in the track deployment unit as the set of tracks is deployed from the track deployment unit (operation 1804). The biasing of set of tracks in operation 1804 to hold the set of tracks in tension may help reduce any slack in the set of tracks during deployment to within selected tolerances. In other words, the biasing system 151 may positively constrain the set of tracks in the forward direction. Further, this tension may also aid in the later retraction of the set of tracks.

A portion of attachment units associated with the set of tracks may be aligned with and engaged with a corresponding portion of a number of structural members of the structure successively in a forward sequence as the set of tracks is deployed (operation 1806), with the process terminating thereafter. The engagement of these attachment units with the corresponding portion of the number of structural members of the structure helps support and stabilize the robotic vehicle relative to the structure. Further, the engagement of these attachment units with the corresponding portion of the number of structural members helps ensure substantially smooth movement of the robotic vehicle through the space relative to the structure.

With reference now to FIG. 19, an illustration of a process for moving a robotic vehicle through a space relative to a structure is depicted in the form of a flowchart in accordance with an illustrative embodiment. The process illustrated in FIG. 19 may be implemented to move robotic vehicle 102 from FIG. 1 through space 108 in FIG. 1.

The process may begin by moving a set of movement members associated with a base of a robotic vehicle to move the base in a reverse direction through a space relative to a structure (operation 1900). A set of tracks associated with the set of movement members may be retracted into a track deployment unit as the base is moved in the reverse direction (operation 1902).

Each of the set of tracks may be maintained in tension using a biasing system in the track deployment unit as the set of tracks is retracted into the track deployment unit (operation 1904). In operation 1904, the biasing of the set of tracks may help retract the set of tracks. For example, as the base moves in the reverse direction, the force being applied to the set of tracks in a forward direction decreases. As this force decreases, the tension on the set of tracks applied by the biasing system causes the set of tracks to retract into the track deployment unit.

Any of the attachment units associated with the set of tracks that are engaged with any of a number of structural members of the structure may disengage successively in a reverse sequence as the base is moved in the reverse direction (operation 1906), with the process terminating thereafter. In operation 1906, disengagement of an attachment unit occurs because movement of the base in the reverse direction and retraction of the set of tracks detaches the attachment off of the corresponding structural member. For example, as the base is moved in the reverse direction and the set of tracks is retracted, a number of forces may pull the attachments units off of the structural members. These forces may be, for example, due to the biasing by the biasing system.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, or some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in the form of a block diagram in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in the form of a block diagram in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20. In particular, robotic vehicle 102 from FIG. 1 may be used to perform number of operations 104 during any one of the stages of aircraft manufacturing and service method 2000. For example, without limitation, robotic vehicle 102 from FIG. 1 may be used to perform number of operations 104 within a wing box of aircraft 2100 during at least one of component and subassembly manufacturing 2006, system integration 2008, routine maintenance and service 2014, or some other stage of aircraft manufacturing and service method 2000.

In one illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014, or both. The use of a number of the different illustrative embodiments may substantially expedite the assembly of aircraft 2100, reduce the cost of aircraft 2100, or both.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for moving a robotic vehicle relative to a structure, the method comprising:
    deploying a set of tracks associated with a base of the robotic vehicle in a forward direction;
    moving a set of movement members associated with the base in the forward direction to move the base in the forward direction and to cause the set of tracks to be deployed in the forward direction;
    aligning a number of attachment units associated with the set of tracks with a corresponding portion of a number of structural members of the structure in a forward sequence as the set of tracks is deployed; and
    securing the number of attachment units to the corresponding portion of the number of structural members in the forward sequence.

2. The method of claim 1, wherein deploying the set of tracks comprises:
    deploying the set of tracks from a track deployment unit in the forward direction in response to the set of movement members associated with the base moving in the forward direction.

3. The method of claim 2, wherein deploying the set of tracks from the track deployment unit comprises:
    unwinding the set of tracks from a set of reels in the track deployment unit in response to the set of movement members moving in the forward direction.

4. The method of claim 1, further comprising:
    controlling, by a controller, the set of movement members.

5. The method of claim 1, wherein aligning the number of attachment units comprises:
    positioning an attachment unit relative to a structural member as the set of tracks is deployed in the forward direction over the structural member.

6. The method of claim 5, wherein securing the number of attachment units comprises:
    securing the number of attachment units to the corresponding portion of the number of structural members in the forward sequence such that the robotic vehicle is stabilized relative to the structure.

7. The method of claim 5, wherein securing the number of attachment units comprises:
    applying force to the attachment unit with the attachment unit positioned relative to the structural member as the set of tracks is deployed in the forward direction to secure the attachment unit to the structural member.

8. The method of claim 1 further comprising:
    retracting the set of tracks while the base is moved in a reverse direction; and
    detaching the number of attachment units associated with the set of tracks in a reverse sequence as the set of tracks is retracted.

9. The method of claim 8, wherein retracting the set of tracks comprises:
    retracting the set of tracks into a track deployment unit in response to the set of movement members associated with the base moving in the reverse direction.

10. The method of claim 9, wherein detaching the number of attachment units comprises:
    detaching the number of attachment units in response to a number of forces pulling the number of attachment units off of the corresponding portion of the number of structural members as the base is moved in the reverse direction.

11. The method of claim 8, wherein retracting the set of tracks comprises:
    retracting the set of tracks using a biasing system in a track deployment unit.

12. The method of claim 1 further comprising:
    moving the robotic vehicle to a selected position relative to the structure; and
    performing a number of operations at the selected position using a number of tools associated with the robotic vehicle.

13. The method of claim 1 further comprising:
    moving the robotic vehicle through an access opening in the structure until at least at least one of the number of attachment units engages with at least one of the number of structural members of the structure, wherein the structure is a wing box and the number of structural members is a number of stringers.

14. An apparatus comprising:
    a base;
    a set of movement members associated with the base;
    a set of tracks associated with the set of movement members, wherein moving the base in a forward direction relative to a structure using the set of movement members causes the set of tracks to be deployed in the forward direction; and
    a number of attachment units associated with the set of tracks.

15. The apparatus of claim 14, further comprising:
    a controller that controls the set of movement members.

16. The apparatus of claim 14, wherein the number of attachment units is configured for aligning with and engaging a corresponding portion of a number of structural members of the structure in a forward sequence.

17. The apparatus of claim 14 further comprising:
    a track deployment unit.

18. The apparatus of claim 17, wherein the track deployment unit houses at least a portion of the set of tracks and where the set of tracks is deployed from the track deployment unit.

19. The apparatus of claim 17, wherein a first movement of the set of movement members in a forward direction causes the set of tracks to be deployed from the track deployment unit in the forward direction.

20. The apparatus of claim 19, wherein a second movement of the set of movement members in a reverse direction causes the set of tracks to be retracted into the track deployment unit.

21. The apparatus of claim 17, wherein the track deployment unit comprises:
a biasing system that biases the set of tracks as the set of tracks is deployed and enables retraction of the set of tracks when the base is moved in a reverse direction.

22. The apparatus of claim 14 further comprising:
a number of tools associated with the base.

23. The apparatus of claim 14, wherein moving the base relative to a structure moves the base forward towards the structure to move a number of tools forward towards the structure.

24. The apparatus of claim 14, wherein the set of movement members comprises a set of wheels.

25. The apparatus of claim 14, wherein an attachment unit in the number of attachment units comprises:
a base element associated with at least one of the set of tracks; and
a set of securing elements associated with the base element and configured for securing the attachment unit to a corresponding structural member.

26. The apparatus of claim 25, wherein the set of securing elements comprises at least one of a suction cup, a vacuum attachment device, a clamping device, a layer of temporary adhesive, removable tape, a bladder, or an element comprised of an elastomeric material.

27. The apparatus of claim 25, wherein the base element has a shape selected based on a cross-sectional shape of a structural member.

28. The apparatus of claim 25, wherein the attachment unit further comprises:
a number of bearings associated with the base element.

29. The apparatus of claim 14 further comprising:
a guidance system associated with the base for guiding movement of the base.

30. The apparatus of claim 29, wherein the guidance system includes at least one of a laser device or an imaging system.

31. The apparatus of claim 30 further comprising:
a controller that controls the set of movement members based on information received from the guidance system.

32. The apparatus of claim 14, wherein the base, the set of movement members, and the set of tracks form a robotic vehicle that has a shape and a size configured for moving the robotic vehicle into a space within an interior of a structure.

33. The apparatus of claim 32, wherein the space is within an interior of a wing box of an aircraft and wherein the number of attachment units is configured to engage a number of stringers as the robotic vehicle moves through the space.

34. The apparatus of claim 14, wherein the number of attachment units is configured to engage a number of structural members of a structure.

35. A robotic vehicle comprising:
a base;
a number of tools associated with the base; and
a movement system associated with the base for moving the base and the number of tools within a space relative to a structure in which the movement system comprises:
a set of movement members associated with the base for moving the base in one of a forward direction and a reverse direction;
a set of tracks that is associated with the set of movement members and that is deployed when the base is moved in the forward direction and retracted when the base is moved in the reverse direction; and
a plurality of attachment units associated with the set of tracks, wherein a number of attachment units in the plurality of attachment units is configured to align with and engage a corresponding portion of a number of structural members as the set of tracks is deployed.

* * * * *